(12) United States Patent
Kaneko

(10) Patent No.: US 12,498,183 B2
(45) Date of Patent: Dec. 16, 2025

(54) PLATE STACKING TYPE HEAT EXCHANGER

(71) Applicant: SANDEN CORPORATION, Gunma (JP)

(72) Inventor: Akira Kaneko, Gunma (JP)

(73) Assignee: SANDEN CORPORATION, Gunma (JP)

( * ) Notice: Subject to any disclaimer, the term of this patent is extended or adjusted under 35 U.S.C. 154(b) by 213 days.

(21) Appl. No.: 18/043,952

(22) PCT Filed: Aug. 24, 2021

(86) PCT No.: PCT/JP2021/030901
§ 371 (c)(1),
(2) Date: Mar. 3, 2023

(87) PCT Pub. No.: WO2022/059437
PCT Pub. Date: Mar. 24, 2022

(65) Prior Publication Data
US 2023/0366641 A1  Nov. 16, 2023

(30) Foreign Application Priority Data
Sep. 18, 2020 (JP) .................. 2020-157538

(51) Int. Cl.
*F28D 9/00* (2006.01)
*F28D 1/03* (2006.01)
(Continued)

(52) U.S. Cl.
CPC ............ *F28F 3/046* (2013.01); *F28D 9/0006* (2013.01); *F28D 9/02* (2013.01); *F28D 1/0308* (2013.01); *F28F 1/045* (2013.01)

(58) Field of Classification Search
CPC .......... F28D 1/0308; F28D 9/006; F28D 9/02; F28F 9/0273; F28F 1/045
See application file for complete search history.

(56) References Cited

U.S. PATENT DOCUMENTS 3,018,543 A * 1/1962 Beck .................. F28F 3/14
                                                       228/173.6
4,407,359 A * 10/1983 Berger ................ F28D 9/0043
                                                       165/167
(Continued)

FOREIGN PATENT DOCUMENTS

EP  2136175 A1 * 12/2009 ........... F28D 9/0006
JP  S59-195389 U  12/1984
(Continued)

OTHER PUBLICATIONS

Translation of WO2017169411A1 named Translation-WO2017169411A1 (Year: 2017).*
(Continued)

*Primary Examiner* — Paul Alvare
(74) *Attorney, Agent, or Firm* — Rankin, Hill & Clark LLP

(57) ABSTRACT

A plate-stacked heat exchanger is proposed which exchanges heat with high heat exchange efficiency in flow paths each including an internal space bulging outward between two heat transfer plates. A flow path forming portion includes a plurality of flow path bulging portions that bulges outward of a heat exchanger plate and forms heat exchange flow paths of a first heating medium therein, and a header portion includes a communication hole communicating with the header portion of an adjacent heat exchanger plate, and a flow path forming portion-side expanded portion expanding from the communication hole toward the flow path forming portion, and the flow path forming portion-side expanded portion communicates with the plurality of heat exchange flow paths. Consequently, heat can be exchanged in a greater width. Therefore, a high heat exchange rate can be obtained.

13 Claims, 18 Drawing Sheets

(51) Int. Cl.
 *F28D 9/02* (2006.01)
 *F28F 1/04* (2006.01)
 *F28F 3/04* (2006.01)

(56) References Cited

U.S. PATENT DOCUMENTS

| | | | | |
|---|---|---|---|---|
| 6,016,865 | A * | 1/2000 | Blomgren | F28F 3/046 |
| | | | | 165/906 |
| 6,047,769 | A | 4/2000 | Shimoya et al. | |
| 6,401,804 | B1 * | 6/2002 | Shimoya | F28F 3/005 |
| | | | | 165/148 |
| 7,343,965 | B2 | 3/2008 | Memory et al. | |
| 2002/0129926 | A1 | 9/2002 | Yamaguchi | |
| 2004/0069441 | A1 * | 4/2004 | Burgers | F28D 1/0333 |
| | | | | 165/41 |
| 2005/0155749 | A1 | 7/2005 | Memory et al. | |
| 2014/0332183 | A1 * | 11/2014 | Choi | F28D 9/0062 |
| | | | | 165/95 |
| 2015/0338169 | A1 * | 11/2015 | Okami | F28F 3/046 |
| | | | | 165/157 |
| 2016/0204486 | A1 * | 7/2016 | Kenney | F28F 3/12 |
| | | | | 29/890.03 |
| 2017/0254596 | A1 | 9/2017 | Noel-Baron | |
| 2022/0026152 | A1 * | 1/2022 | Wei | F28D 1/0333 |

FOREIGN PATENT DOCUMENTS

| | | | | |
|---|---|---|---|---|
| JP | 2002122393 | A * | 4/2002 | ........... F28D 9/0043 |
| JP | 2002-277177 | A | 9/2002 | |
| JP | 2007-518955 | A | 7/2007 | |
| JP | 4122578 | B2 | 7/2008 | |
| JP | 2013-145064 | A | 7/2013 | |
| JP | 2014-134363 | A | 7/2014 | |
| JP | 2017-528674 | A | 9/2017 | |
| JP | 2017-180857 | A | 10/2017 | |
| JP | 2020-118369 | A | 8/2020 | |
| WO | WO-2017169411 | A1 * | 10/2017 | ............... F28D 1/03 |
| WO | WO-2021075334 | A1 * | 4/2021 | ........... F28D 1/0333 |

OTHER PUBLICATIONS

Translation of WO2021075334A1 named Translation-WO2021075334A1 (Year: 2021).*
Translation of JP2002122393A named Translation-JP2002122393A (Year: 2002).*
Translation of EP2136175A1 named Translation-EP2136175A1 (Year: 2009).*
International Search Report mailed on Oct. 12, 2021 for PCT/JP2021/030901.
Office Action issued on Jul. 29, 2024 for the corresponding JP Patent Application No. 2020-157538.

* cited by examiner

PLATE STACKING TYPE HEAT EXCHANGER

TECHNICAL FIELD

The present invention relates to a heat exchanger, for example, a heat exchanger suitable for air conditioning equipment of a vehicle.

BACKGROUND ART

Conventionally, a plate-stacked heat exchanger has been proposed which is provided with an internal space formed by stamping between two heat transfer plates to exchange heat using the internal space as a flow path. Heat exchangers of the same type are capable of heat exchange between liquids, between a gas and a liquid, or between gases. Patent Literature 1 describes a heat exchanger that is of a plate-stacked type and exchanges heat between air for air conditioning and a refrigerant.

CITATION LIST

Patent Literature

Patent Literature 1: Japanese Patent No. 4122578

SUMMARY OF INVENTION

Problems to be Solved by Invention

In the invention of Patent Literature 1, when an attempt is made to further increase the amount of heat exchanged, it is necessary to lengthen a core unit in a direction in which the refrigerant flows and to enlarge the core unit in a ventilation direction, and it is necessary to increase the size of the heat exchanger. In the case of such a heat exchanger, there is a possibility that an installation space cannot be secured when the heat exchanger is provided in a limited space for, for example, vehicles.

An object of the present invention is to solve such a problem, and to provide a heat exchanger capable of securing a necessary amount of heat exchanged without increasing the size of the heat exchanger too much.

Solution to Problems

In order to solve the above-mentioned problem, the present invention adopts the following configurations:

In other words, a heat exchanger according to one aspect of the present invention is a heat exchanger including: a heat exchanger core through which a first heating medium flows; and a case covering the heat exchanger core, the heat exchanger being configured to exchange heat between the first heating medium and a second heating medium flowing between the outside of the heat exchanger core and the inside of the case, in which the heat exchanger core includes a core unit in which a plurality of heat exchanger plates each obtained by laying a first plate member and a second plate member on top of each other are stacked in a stacking direction, each of the heat exchanger plates includes a flow path forming portion and a header portion, each of the flow path forming portions includes a plurality of flow path bulging portions that bulges outward of the heat exchanger plate and forms a heat exchange flow path of the first heating medium therein, each of the header portions includes a communication hole communicating with the header portion of the adjacent heat exchanger plate, and a flow path forming portion-side expanded portion expanding from the communication hole toward the flow path forming portion, and each of the flow path forming portion-side expanded portions communicates with a plurality of the heat exchange flow paths.

According to this configuration, heat transfer between the first heating medium flowing through the flow path forming portions and the second heating medium flowing outside the flow path forming portions is promoted, and heat can be exchanged with high heat exchange efficiency. An area for heat exchange can be increased due to the flow path bulging portions, but the shape can be made compact. The flow paths can be expanded by the flow path forming portion-side expanded portions.

Moreover, as another mode of the heat exchanger according to the one aspect, each of the header portions may include a header bulging portion bulging outward on one of the first plate member and the second plate member, and a header flat portion that is flat on the other, and in the core unit, the header bulging portion of the heat exchanger plate and the header flat portion of its adjacent heat exchanger plate may be stacked in such a manner as to face each other.

According to this configuration, the header bulging portions do not face each other; therefore, gaps are created in the flow path forming portion-side expanded portions of the stacked heat exchanger plates, and a flow path of the second heating medium can be secured.

Moreover, as another mode of the heat exchanger according to the one aspect, the flow path bulging portions may be in contact with the flow path bulging portions and/or the header bulging portion of the adjacent heat exchanger plate.

According to this configuration, the strength of the heat exchanger core can be improved by bringing the adjacent bulging portions into contact with each other.

Moreover, as another mode of the heat exchanger according to the one aspect, in the header portion provided at each end of the flow path forming portion of the each of the heat exchanger plates, the header bulging portions may be provided to only one of the first plate member and the second plate member.

According to this configuration, the shapes of the first plate member and the second plate member are greatly different from each other; therefore, it is easy to distinguish them at the time of manufacturing. Moreover, it is easy to form a plate shape where a flow path with suppressed flow resistance is formed.

Moreover, as another mode of the heat exchanger according to the one aspect, in the header portion provided at each end of the flow path forming portion of the each of the heat exchanger plates, the header bulging portion may be provided to each of the first plate member and the second plate member.

According to this configuration, it is possible to achieve commonality of a mold used for manufacturing, depending on the shapes of the plate members.

Moreover, as another mode of the heat exchanger according to the one aspect, the communication holes may be provided at diagonal corner portions of the each of the heat exchanger plates.

According to this configuration, the first heating medium can flow with only a minor imbalance in circulation at every point in the heat exchanger plates. Moreover, the second heating medium flowing outside the heat exchanger plates can also flow with only a minor imbalance in circulation.

Moreover, as another mode of the heat exchanger according to the one aspect, the flow path bulging portions may have an approximately rectangular cuboid or arcuate bulging shape, and each of the flow path bulging portions of the first plate member and the second plate member may be substantially symmetrical in a longitudinal direction with respect to a circulation direction of the first heating medium.

According to this configuration, while heat is efficiently exchanged, the each of the flow path bulging portions is substantially symmetrical in the longitudinal direction; therefore, changes in direction in the width direction are uniform, and the flow resistance of the first heating medium and the second heating medium can be reduced.

Moreover, as another mode of the heat exchanger according to the one aspect, the heat exchanger core may include end plates at two ends of the core unit in the stacking direction, and the end plates may be in contact with the header portions and/or the flow path bulging portions of the heat exchanger plates located at the two ends.

According to this configuration, the second heating medium can be passed also between the end plates and the core unit, and heat can be efficiently exchanged.

Moreover, as another mode of the heat exchanger according to the one aspect, an inner peripheral portion of the case may be configured in such a manner as to be in contact with an outer peripheral portion of the heat exchanger core, a second inlet and a second outlet that are an inlet and an outlet of the second heating medium may be provided to an outer surface of the case, and one or more second inlets and one or more second outlets may be included.

According to this configuration, heat can be efficiently exchanged inside the case. Moreover, if there is a plurality of pipes for inflow and outflow of the second heating medium, the pipes can be mounted directly on the heat exchanger.

Moreover, the case may include therein, a partition portion substantially parallel to a plane of the plate where the heat exchanger plate extends, in any position in the stacking direction of the core unit, and the flow path of the second heating medium may be partitioned by the partition portion in the stacking direction.

According to this configuration, the flow velocity per gap of the second heating medium flowing through a plurality of gaps in the core unit increases, and the heat transfer coefficient improves. Consequently, the amount of heat exchanged between the first heating medium and the second heating medium can be increased. Moreover, the length of the flow path can also be increased. Moreover, if there are large differences in the distances from the inlet and the outlet to the plurality of gaps in the core unit, the amount of flow of the second heating medium between a near gap and a far gap is likely to vary. However, the differences in the distances are reduced; therefore, an uneven flow is suppressed. Therefore, heat exchange efficiency improves.

Moreover, the heat exchanger core may include: the heat exchanger plates; and a partition plate being the heat exchanger plate provided with a closed portion, and the partition plate may be provided with the closed portion in the communication hole of at least one of the first plate member and the second plate member.

According to this configuration, the flow velocity per heat exchanger plate of the first heating medium flowing through the plurality of heat exchanger plates increases, and the heat transfer coefficient improves. Consequently, the amount of heat exchanged between the first heating medium and the second heating medium can be increased. Moreover, the length of the flow path can also be increased. Moreover, if there are large differences in the distances from the inlet and the outlet to the plurality of heat exchanger plates, the amount of flow of the first heating medium between a near heat exchanger plate and a far heat exchanger plate is likely to vary. However, the differences in the distances are reduced; therefore, an uneven flow of the first heating medium is suppressed. The closed portion includes not only the configuration in which the communication hole is blocked by the cap-shaped closed portion but also various configurations for closure such as a configuration using a plate having no communication hole.

Moreover, as another mode of the heat exchanger according to the one aspect, the each of the header portions may include a reinforcing member therein. According to this configuration, for example, a joint is reinforced inside the each of the header portions; therefore, a leak due to the pressure of the first heating medium is less likely to occur.

Moreover, as another mode of the heat exchanger according to the one aspect, a tubular member substantially in contact with inner peripheral surfaces of the stacked communication holes may be inserted as the reinforcing member into the heat exchanger core, and the tubular member may be provided with a plurality of hole portions aligned with a plurality of the header portions aligned in the stacking direction.

According to this configuration, the strength of the each of the header portions is improved by the tubular member. Moreover, the heat exchanger plates can be stacked using the tubular member as a guide during assembly; therefore, an improvement in productivity is promoted.

Effects of Invention

According to the present invention, a heat exchanger having a high heat exchange rate can be obtained.

DESCRIPTION OF EMBODIMENTS

Figure 1:
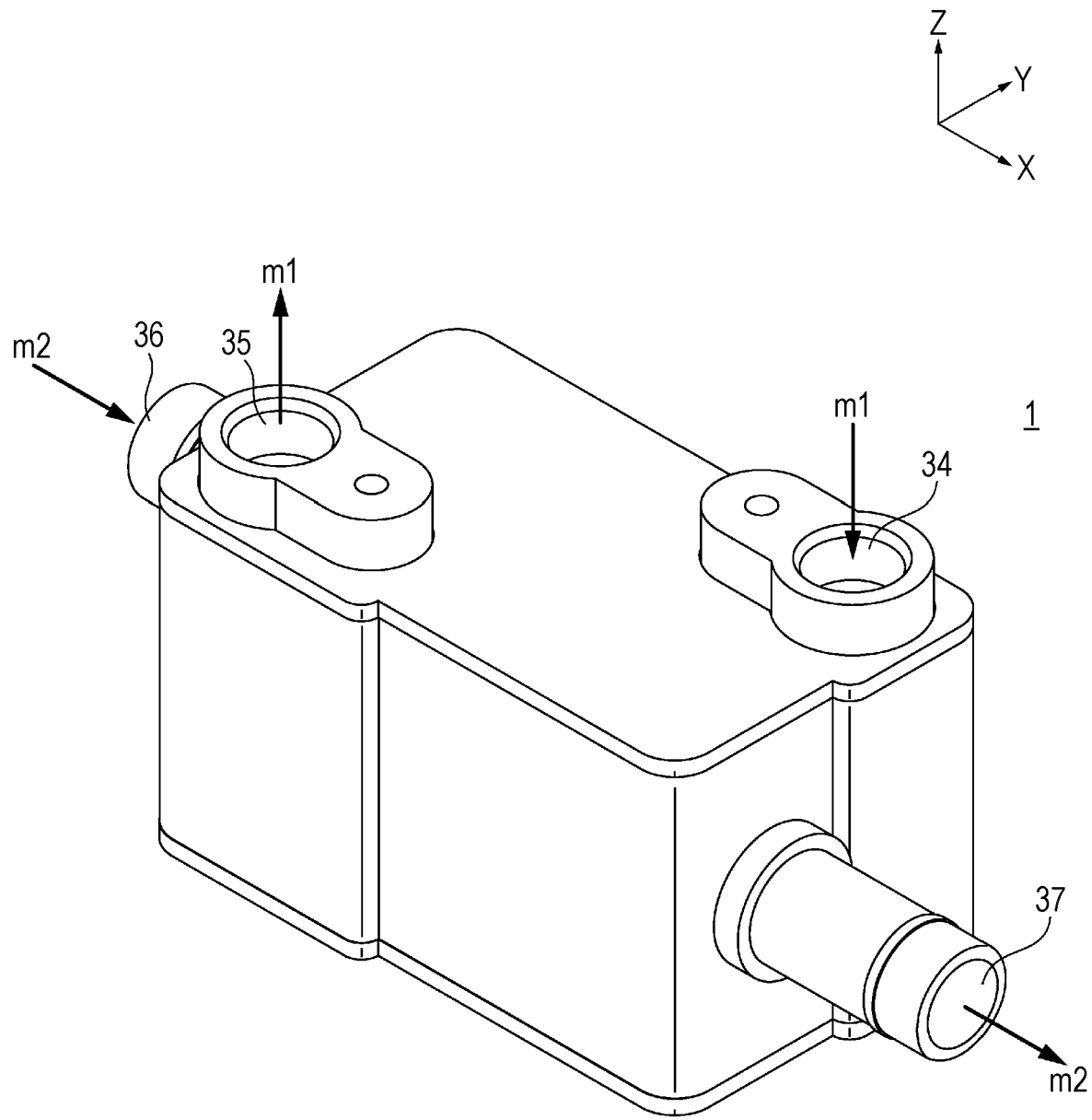
FIG. 1 is a perspective view of a heat exchanger 1 in Example 1.

In the present application, for example, the terms up/upper/top and down/lower/bottom are used. They are used for the sake of convenience to indicate relative relationships of the configurations in the drawings. When a heat exchanger of an embodiment is installed upside down, the upper side described in the present application is changed to the lower side at the time of installation. Moreover, when the heat exchanger is installed on its side and used, the up-and-down direction is changed to the lateral direction, and when the heat exchanger is installed obliquely and used, the up-and-down direction is changed to the obliquely vertical direction.

Moreover, in the present application, the drawings and the like are illustrated, letting that a circulation direction x of a first heating medium m1 be an x-direction, letting a width direction y perpendicular to the circulation direction x be a y-direction, and letting a stacking direction z that is the up-and-down direction perpendicular to the circulation direction x and the width direction y be a z-direction. The first heating medium m1 flows in a zigzag manner in a heat exchanger plate, but as a whole, the first heating medium m1 flows parallel to the side of the heat exchanger plate. Let this be the circulation direction x.

Example 1

FIG. 1 is a diagram of a heat exchanger 1 of Example 1 as viewed obliquely from above. The heat exchanger 1 has an approximately hexahedral shape. A first inlet 34 through which a first heating medium m1 flows in and a first outlet 35 through which the first heating medium m1 flows out are provided in diagonal positions on the upper surface. Moreover, a second inlet 36 through which a second heating medium m2 flows in, and a second outlet 37 are provided in a side surface of the heat exchanger 1. The second inlet 36 is provided in a surface close to the first outlet 35, and is placed off-center in a position away from the first outlet 35. Moreover, the second outlet 37 is provided in a surface close to the first inlet 34, and is placed off-center in a position away from the first inlet 34.

Figure 2:
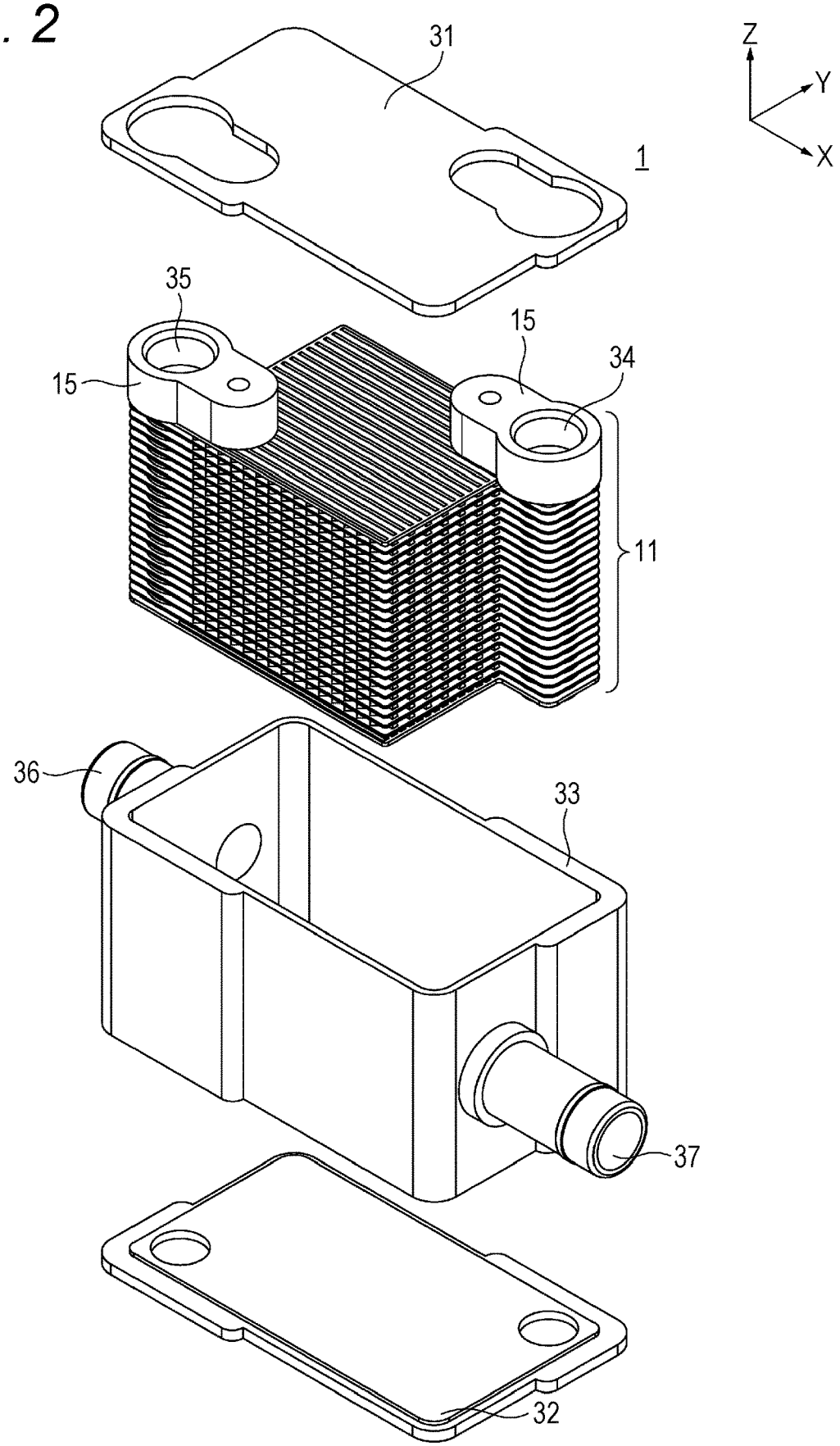
FIG. 2 is an exploded perspective view of the heat exchanger 1 in Example 1.

FIG. 2 is a diagram of the disassembled heat exchanger 1 of Example 1 as viewed obliquely from above. A heat exchanger core 11 is installed in a tubular case member 33. The heat exchanger core 11 is housed in a case including the case member 33 and cover members 31 and 32 except pads 15. The main elements of the heat exchanger core 11 are stored in the case member 33 and covered by the cover member 31 and the cover member 32. The top and bottom of the case member 33 are closed with the cover member 31 and the cover member 32 to form the case. The cover member 31 is provided with holes through which the pads 15 constituting the first inlet 34 and first outlet 35 of the heat exchanger core 11 pass. Moreover, the case member 33 includes the second inlet 36 and the second outlet 37 that protrude from an outer surface thereof. The cover member 32 is not provided with a hole. The second inlet 36 and the second outlet 37 communicate with the inside of the case member 33. The case including the case member 33, the cover member 31, and the cover member 32 is made of resin. Moreover, the heat exchanger core 11 is formed by integrating aluminum components together by aluminum brazing. Furthermore, the outer surface of the heat exchanger core 11 is coated with resin to prevent deterioration of the heat exchanger core 11 made of aluminum due to the second heating medium m2.

Figure 3:
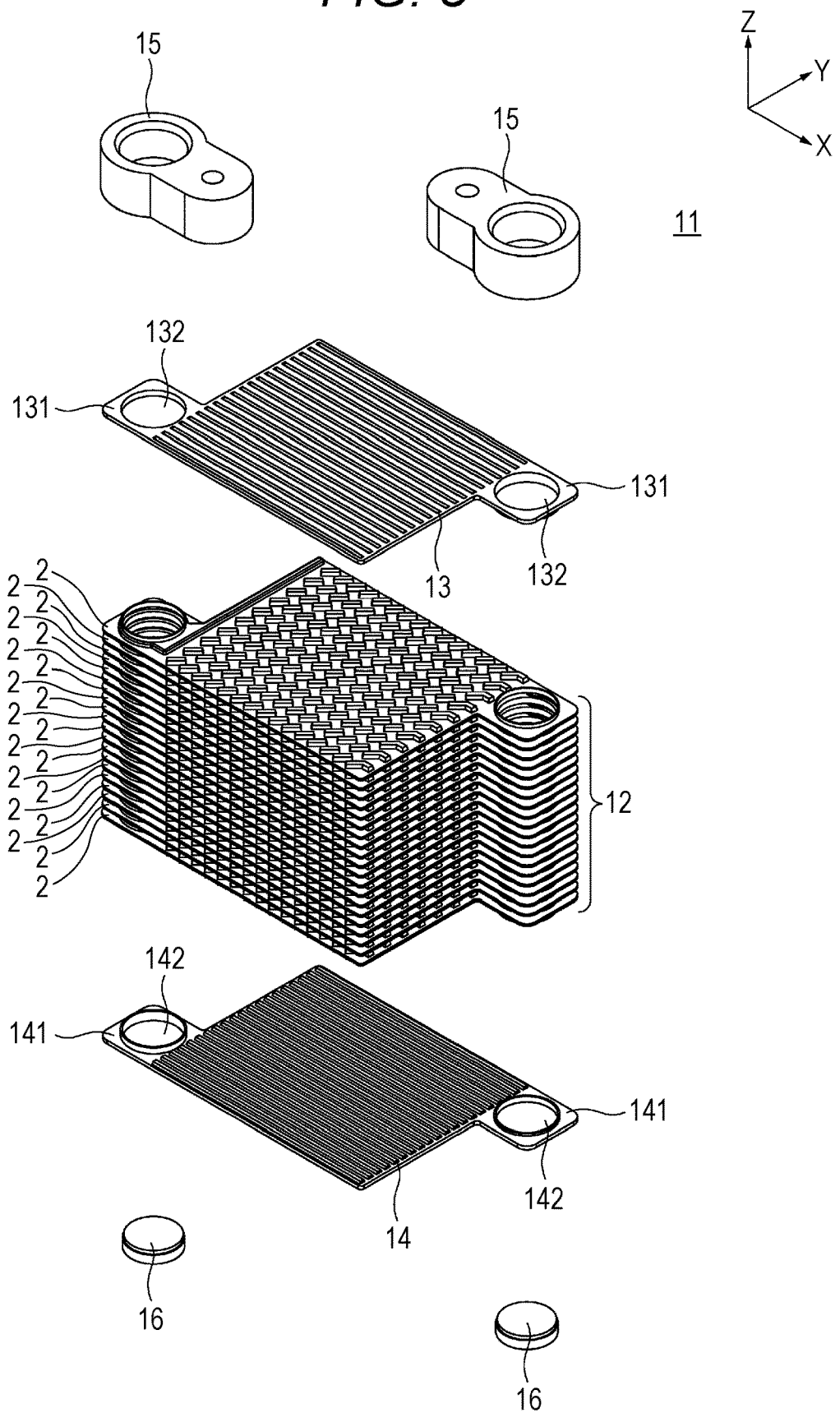
FIG. 3 is an exploded perspective view of a heat exchanger core 11 in Example 1.

FIG. 3 is a diagram of the disassembled heat exchanger core 11 of Example 1 as viewed obliquely from above. The heat exchanger core 11 has a core unit 12 in which a plurality of heat exchanger plates 2 is stacked. The top surface of the core unit 12 is closed with an upper end plate 13, and the undersurface is closed with a lower end plate 14. Projecting portions 131 are provided in diagonal positions of the upper end plate 13. A hole 132 that protrudes downward and forms a short cylinder is bored in each of the projecting portions 131. Each of the pads 15 is aligned with the position of the respective hole 132 and mounted by brazing. Moreover, projecting portions 141 are also provided in diagonal positions of the lower end plate 14. A hole 142 that protrudes upward and forms a short cylinder is bored in each of the projecting portions 141. Each of the two holes 142 is closed with a cap 16. The core unit 12 is formed by stacking the plurality of heat exchanger plates 2.

Figure 4:
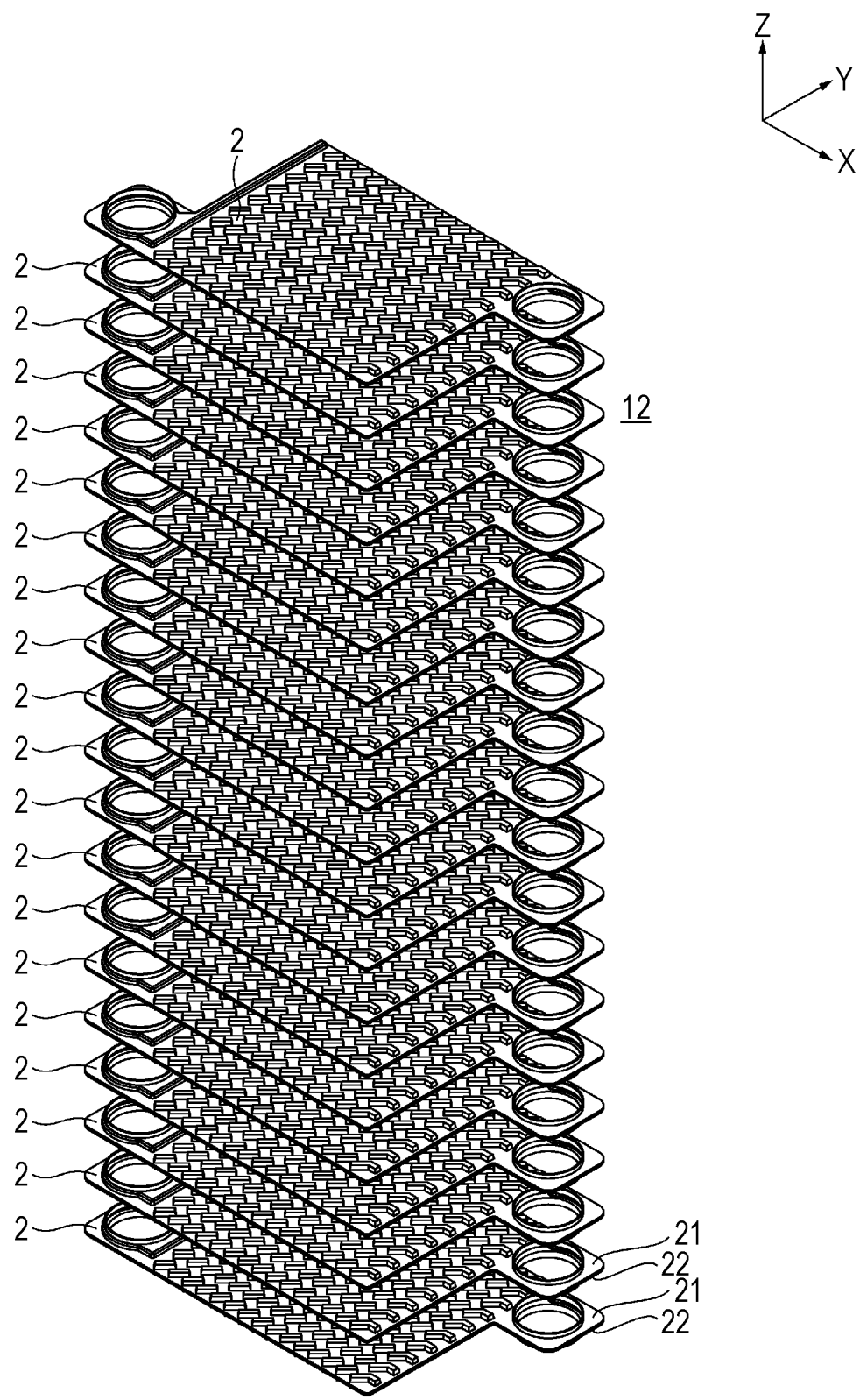
FIG. 4 is an exploded perspective view of a core unit 12 in Example 1.

FIG. 4 is a diagram of the disassembled core unit 12 of Example 1 as viewed obliquely from above. The core unit 12 is formed by stacking the plurality of heat exchanger plates 2 having the same configuration. Each of the heat exchanger plates 2 is formed by laying an upper plate 21 (a first plate member) and a lower plate 22 (a second plate member) on top of each other.

Figure 5:
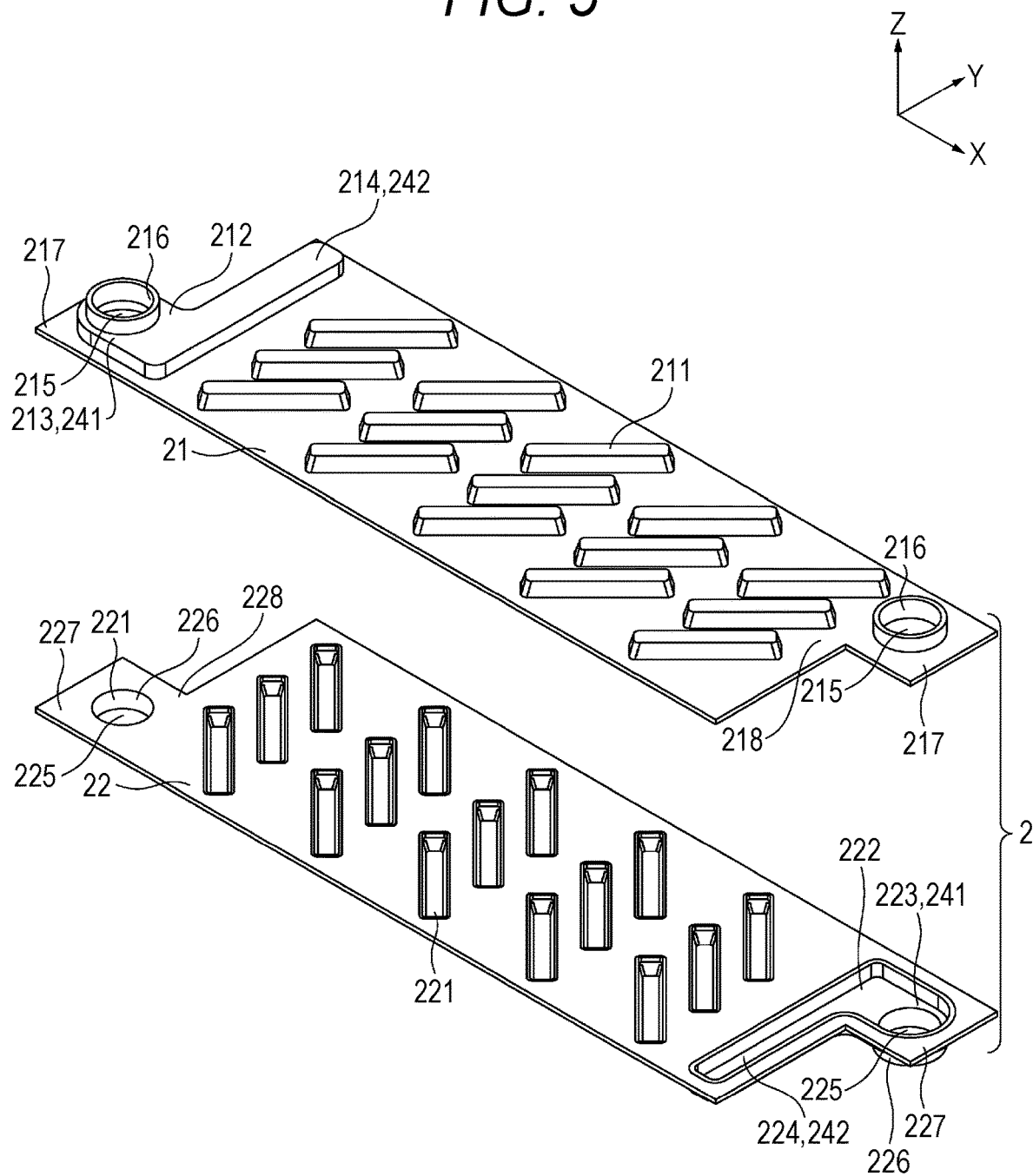
FIG. 5 is an exploded perspective view for explaining a heat exchanger plate 2.

FIG. 5 is a perspective view illustrating the heat exchanger plate 2 for explanation, in which flow path bulging portions 211 on the upper plate 21 and flow path bulging portions 221 on the lower plate 22 in Example 1 are enlarged and the number of the flow path bulging portions is changed to a reduced number. According to this change, for example, an expanded portion bulging portion 214 of the upper plate 21 and an expanded portion bulging portion 224 of the lower plate 22, which constitute flow path forming portion-side expanded portions, are also illustrated with changes to reduced lengths in the width direction y. The upper plate 21 and the lower plate 22 have many bulging portions. The bulging portions form protrusions on one of the plates, and recesses in the other. The heat exchanger plate 2 is formed by laying the upper plate 21 and the lower plate 22 in FIG. 5 on top of each other as in FIGS. 6 (a) and 6 (b).

Figure 6:
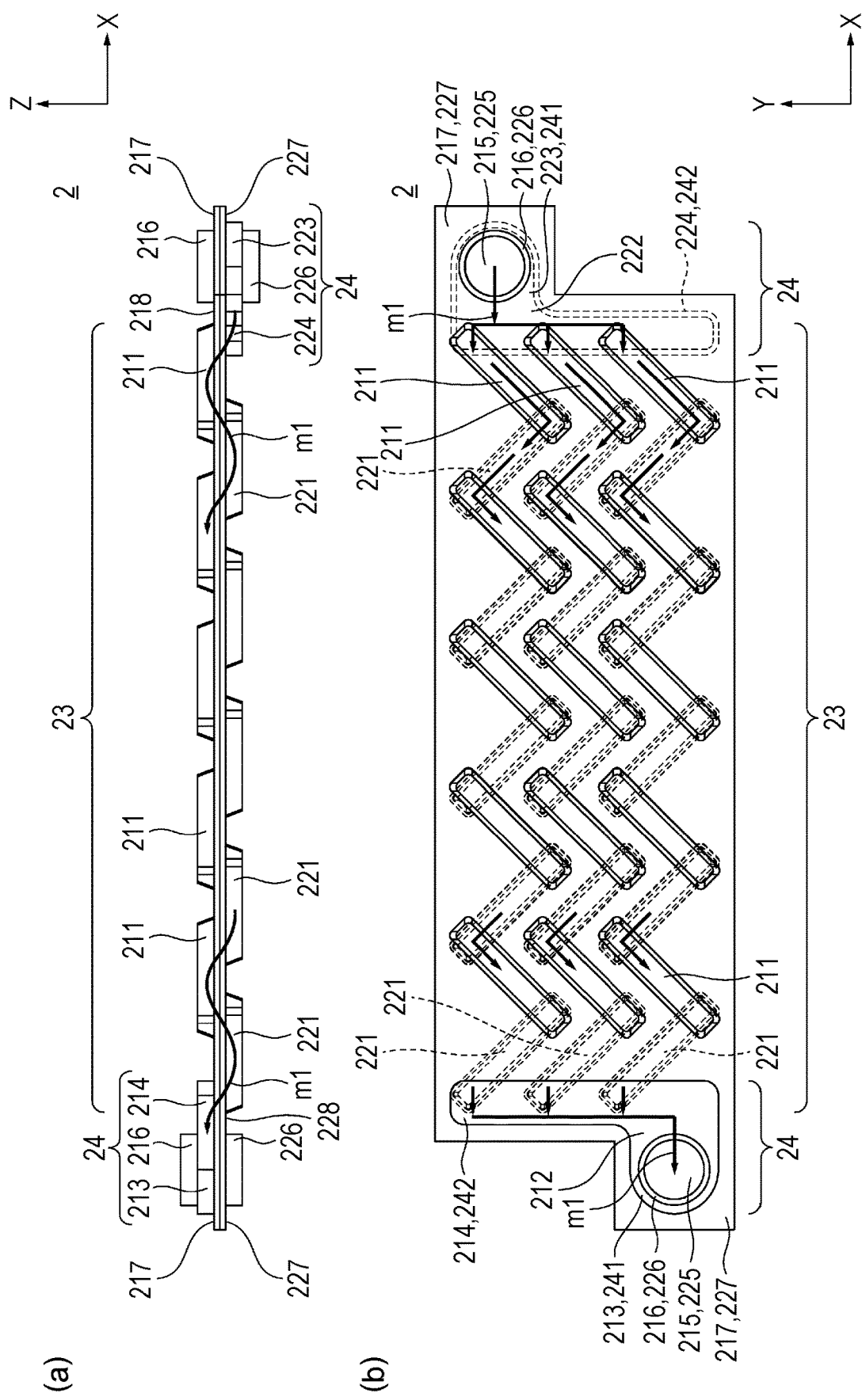
FIGS. 6 (a) and 6 (b) are diagrams for explaining the heat exchanger plate 2.

FIGS. 6 (a) and 6 (b) illustrate the heat exchanger plate 2 having a reduced number of the flow path bulging portions 211 and 221 for explanation. In FIGS. 6 (a) and 6 (b), the upper plate 21 and the lower plate 22 in FIG. 5 are laid on top of each other to form the heat exchanger plate 2. FIG. 6 (a) is a side view as viewed in the width direction y, and FIG. 6 (b) is a plan view as viewed in the stacking direction z. In FIG. 6 (b), hidden portions are indicated by dotted lines. In FIGS. 5 and 6 (a) and 6 (b), a description is given with the signs of Example 1.

As illustrated in FIGS. 6 (a) and 6 (b), the heat exchanger plate 2 includes a flow path forming portion 23 on the inner side in the circulation direction x, and a header portion 24 formed at each end in the circulation direction x so as to partially overlap the flow path forming portion 23. The flow path forming portion 23 includes a plurality of the flow path bulging portions 211 and 221 which bulge outward of the heat exchanger plate 2 and form a plurality of heat exchange flow paths of the first heating medium m1 therein.

As illustrated in FIG. 5, the plurality of the flow path bulging portions 211 is stamped upward on the upper plate 21. The bulging shape of each of the flow path bulging portions 211 is an approximately rectangular cuboid. The each of the flow path bulging portions 211 is provided, extending in an oblique direction between the circulation direction x and the width direction y. The flow path bulging portions 211 of three columns in the circulation direction x and five rows in the width direction y are stamped. FIGS. 5 and 6 (a) and 6 (b) are simplified for explanation, and the numbers of columns and rows of the flow path bulging portions 211 in Example 1 are large as illustrated in, for example, FIG. 3. The same applies to the flow path bulging portions 221 on the lower plate 22 described below. Moreover, a header bulging portion 212 is stamped upward at one end of the upper plate 21. The upper plate 21 is provided with one projecting portion 217 in each of diagonal corner portions. A communication hole 215 is bored in each of the projecting portions 217. The surrounding area of one of the communication holes 215 bulges outward to form a hole surrounding bulging portion 213. Moreover, an expanded portion bulging portion 214 expands from the hole surrounding bulging portion 213 toward the flow path forming portion 23. The hole surrounding bulging portion 213 and the expanded portion bulging portion 214 are connected to form the header bulging portion 212. The lower plate 22 does not bulge outward in a portion facing the header bulging portion 212, and the portion is a header flat portion 228 that is flat. Moreover, the circumference of each of the two communication holes 215 is a cylindrical portion 216 protruding in a short cylindrical shape. On the upper plate 21, the header bulging portion 212 is formed at only one end of the flow path forming portion 23. The other end does not bulge outward, and is the cylindrical portion 216 formed by the circumference of the communication hole 215 protruding in a short cylindrical shape.

The lower plate 22 has a similar shape to the upper plate 21, and is turned upside down and laid on top of the upper plate 21 in FIGS. 5 and 6 (a) and 6 (b). However, the positions of projecting portions 227 are opposite to those of the projecting portions 217. On the lower plate 22, the plurality of the flow path bulging portions 221 is stamped downward. The bulging shape of each of the flow path bulging portions 221 is the same as that of the each of the flow path bulging portions 211 on the upper plate 21, and is a substantially rectangular cuboid. The each of the flow path bulging portions 221 is provided, extending in an oblique direction between the circulation direction x and the width direction y. This extending direction is a direction intersecting with the extending direction of the flow path bulging portions 211 when the lower plate 22 is laid on top of the upper plate 21. In the form of the heat exchanger plate 2, the each of the flow path bulging portions 211 and the each of the flow path bulging portions 221 overlap at their ends in the longitudinal direction. Also on the lower plate 22, the flow path bulging portions 221 of three columns in the circulation direction x and five rows in the width direction y are stamped. Moreover, a header bulging portion 222 is stamped downward at one end of the lower plate 22.

The lower plate 22 is provided with one projecting portion 227 in each diagonal position. A communication hole 225 is bored in each of the projecting portions 227. The surrounding area of one of the communication holes 225 bulges outward to form a hole surrounding bulging portion 223. The expanded portion bulging portion 224 expands from the hole surrounding bulging portion 223 toward the flow path forming portion 23. The hole surrounding bulging portion 223 and the expanded portion bulging portion 224 are connected to form the header bulging portion 222. The upper plate 21 does not bulge outward in a portion facing the header bulging portion 222, and the portion is a header flat portion 218 that is flat.

Moreover, the circumference of each of the communication holes 225 is a cylindrical portion 226 protruding in a short cylindrical shape. On the lower plate 22, the header bulging portion 222 is formed at only one end of the flow path forming portion 23. The other end does not bulge outward, and is the cylindrical portion 226 formed by the circumference of the communication hole 225 protruding in a short cylindrical shape.

In the form of the heat exchanger plate 2, the position of the header bulging portion 222 on the lower plate 22 is opposite to the position of the header bulging portion 212 on the upper plate 21 in the circulation direction x and in the stacking direction z. The header bulging portion 222 is formed in such a manner that the expanded portion bulging portion 224 extends in such a manner as to be wider in the width direction y than the communication hole 225 and the hole surrounding bulging portion 223. The lower plate 22 is provided with the two projecting portions 227 at the diagonal corner portions. Each of the projecting portions 227 is provided with the communication hole 225. Moreover, one of the projecting portions 227 is provided with the hole surrounding bulging portion 223.

As illustrated in FIGS. 6 (a) and 6 (b), the header portions 24 include the communication holes 215 and 225 communicating with the header portions 24 of the adjacent heat exchanger plates 2, the header bulging portions 212 and 222 that bulge outward, and the header flat portions 218 and 228 that are flat. Moreover, the header bulging portions 212 and 222 form the hole surrounding bulging portions 213 and 223 that bulge outward from hole surrounding portions 241 around the communication holes 215 and 225, and flow path forming portion-side expanded portions 242 that expand in the width direction y from the communication holes 215 and 225 toward the flow path forming portion 23.

As described above, the two ends of the heat exchanger plate 2 include the hole surrounding portions 241 around the communication holes 215 and 225, and the flow path forming portion-side expanded portions 242 that are next to the hole surrounding portions 241 and close to the flow path forming portion 23, in the upper plate 21 and the lower plate 22. The header bulging portion 212 faces the header flat portion 228, and the header bulging portion 222 faces the header flat portion 218. One of the flow path forming portion-side expanded portions 242 is formed by a part of the header flat portion 228 and the expanded portion bulging portion 214, and the other flow path forming portion-side expanded portion 242 is formed by a part of the header flat portion 218 and the expanded portion bulging portion 224.

The flow path forming portion-side expanded portions 242 that expand in the width direction y communicate with the plurality of heat exchange flow paths of the flow path forming portion and allow the first heating medium m1 to circulate. Heat is exchanged between the first heating medium m1 inside the heat exchange flow paths and the second heating medium m2 outside the heat exchanger plate 2. In a formed form of the core unit 12, the expanded portion bulging portion 214 of the heat exchanger plate 2 and the expanded portion bulging portion 224 of its adjacent heat exchanger plate 2 do not face each other; therefore, the flow paths of the second heating medium m2 flowing in the circulation direction x can be secured.

As illustrated in the plan view of FIG. 6(b), in the header portion 24, the first heating medium m1 spreads in the width direction y in the flow path forming portion-side expanded portion 242 from the communication holes 215 and 225 through the hole surrounding portion 241, and reaches ends of the plurality of the flow path bulging portions 211. Up to this point, the first heating medium m1 passes through the header bulging portion 222 of the lower plate 22. As indicated by arrows, the first heating medium m1 branches into the plurality of heat exchange flow paths and enters the flow path bulging portions 211 of the upper plate 21. The first heating medium m1 advances obliquely relative to the circulation direction x through the recesses of the flow path bulging portions 211, reaches ends of the flow path bulging portions 211, enters the flow path bulging portions 221 of the lower plate 22, and then makes a turn. Furthermore, the first heating medium m1 advances obliquely through the recesses of the flow path bulging portions 221, and advances to ends of the flow path bulging portions 211. The first heating medium m1 repeats this movement, and flows along the circulation direction x while meandering in the width direction y. In the header portion 24, the flows of the first heating medium m1 from the plurality of flow paths merge in the flow path forming portion-side expanded portion 242 as indicated by arrows, converge to the hole surrounding portion 241, and flows out of the communication holes 215 and 225. The flow path forming portion-side expanded portions 242 (the expanded portion bulging portion 214 and the expanded portion bulging portion 224) are formed, in positions facing the circulation direction x in which the first heating medium m1 flows through the heat exchanger plate 2, in such a manner as to be wider than the communication holes 215 and 225 and the hole surrounding bulging portions 213 and 223 in the width direction y perpendicular to the circulation direction x. In the illustrations of FIGS. 5 and 6 (a) and 6 (b), the first heating medium m1 flows through the heat exchange flow paths of the three rows to exchange heat. Moreover, the each of the flow path bulging portions 211 and the each of the flow path bulging portions 221 are substantially symmetrical in the longitudinal direction with respect to the circulation direction x in the stacked state. The flow path forming portion-side expanded portions 242 of the header portions 24 preferably are more than twice as wide as the communication holes 215 and 225, or are more than twice as wide as the hole surrounding bulging portions 213 and 223 of the hole surrounding portions 241, in the width direction y.

Moreover, as the heat exchanger plate 2 is viewed from the side, the first heating medium m1 flows alternately through the recesses of the flow path bulging portions 211 in the upper plate 21 and through the recesses of the flow path bulging portions 221 in the lower plate 22, as indicated by arrows in FIG. 6 (a). The first heating medium m1 flows along the circulation direction x while meandering also in the stacking direction z. In the present application, the +direction and the −direction are not distinguished in the x, y, and z directions.

The first heating medium m1 flows through the heat exchanger plates 2 while meandering in the width direction y and in the stacking direction z; therefore, the flows are always turbulent. Therefore, velocity and thermal boundary layers are unlikely to be formed, and the flow paths are increased in length. As a result, heat transfer is promoted. Furthermore, the communication holes 215 and 225 and the hole surrounding bulging portions 213 and 223, through which the first heating medium m1 flows in and out, are in diagonal positions of the heat exchanger plate 2; therefore, a difference in the velocity of flow in the plurality of flow paths on the way hardly occurs. Moreover, the second heating medium m2 passes between two heat exchanger plates 2 in the circulation direction x. However, the flow path bulging portions 211 and 221 are inclined in the longitudinal direction; therefore, the flows are turbulent, and heat transfer is promoted.

Figure 7:
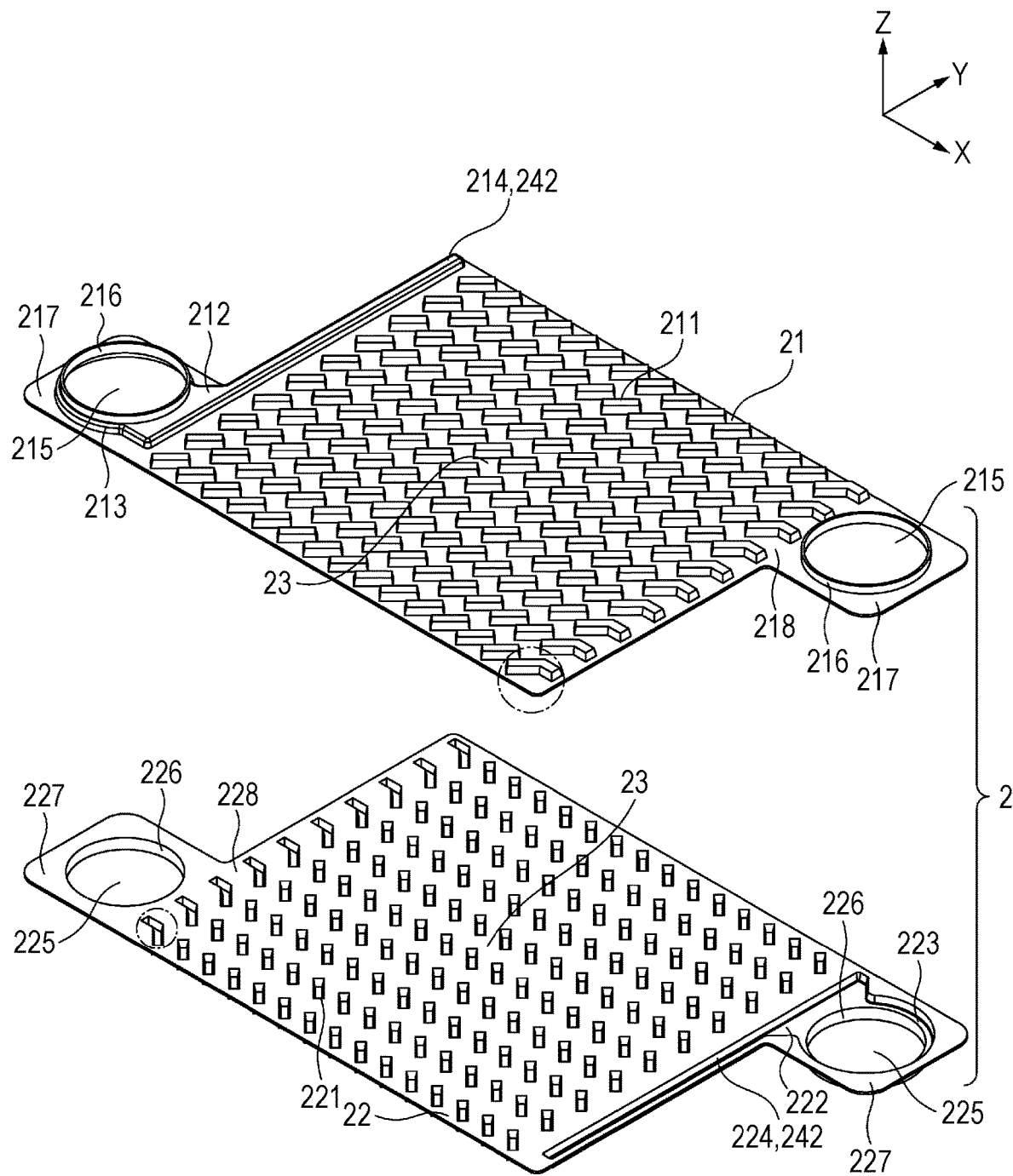
FIG. 7 is an exploded perspective view of the heat exchanger plate 2 in Example 1.

FIG. 7 is a diagram of the disassembled heat exchanger plate 2 of Example 1 as viewed obliquely from above. The heat exchanger plate 2 includes the upper plate 21 and the lower plate 22. In Example 1, many flow path bulging portions 211 and 221 are used, and many heat exchange flow paths are formed in the flow path forming portion 23. Moreover, in Example 1, the flow path bulging portion 211 overlapping with the expanded portion bulging portion 224 and the flow path bulging portion 221 overlapping with the expanded portion bulging portion 214, which are encircled in FIG. 7, are bent in such a manner as to extend in the circulation direction x in the overlapping portions. Furthermore, the upper plate 21 has the projecting portions 217 that project in the circulation direction x, and the lower plate 22 has the projecting portions 227 that project in the circulation direction x. Each of the two projecting portions 217 of the upper plate 21 has the communication hole 215 and the cylindrical portion 216 of the short cylinder pointing upward. In one of the projecting portions 217, the surrounding area of the communication hole 215 bulges outward to form the hole surrounding bulging portion 213, and is connected to the expanded portion bulging portion 214 to form the header bulging portion 212. Moreover, each of the two projecting portions 227 of the lower plate 22 has the cylindrical portion 226 of the short cylinder pointing downward. In one of the projecting portions 227, the surrounding area of the communication hole 225 bulges downward to form the hole surrounding bulging portion 223, and is connected to the expanded portion bulging portion 224 to form the header bulging portion 222. The portions facing the header bulging portions 212 and 222 are the header flat portions 228 and 218 that are flat, and the flow path forming portion-side expanded portions 242 are formed by parts of the header flat portions 228 and 218 and the expanded portion bulging portions 214 and 224. The flow path forming portion-side expanded portions 242 are formed in such a manner as to expand in the width direction y from the communication holes 215 and 225 toward the flow path forming portion 23.

Figure 8:
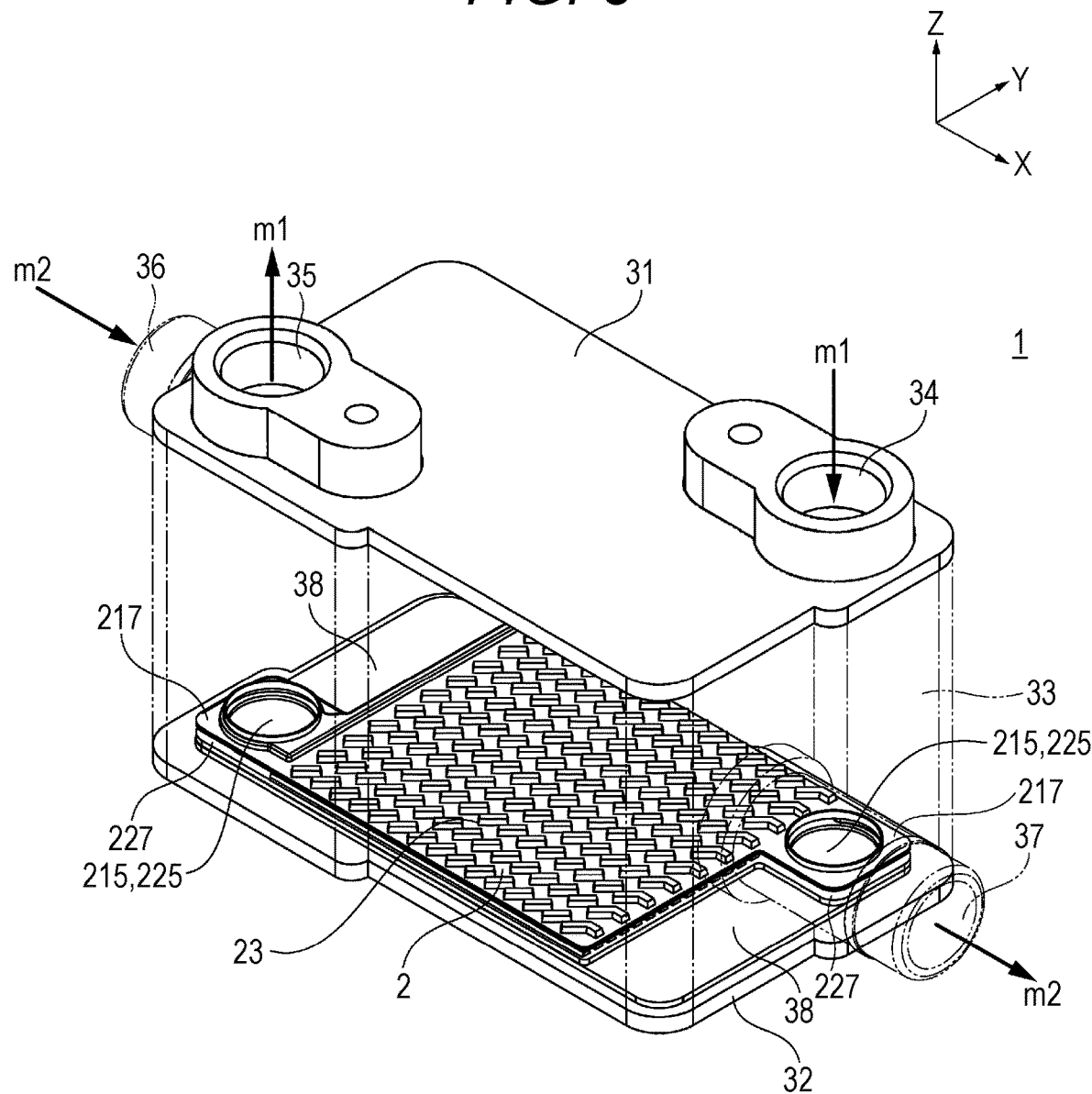
FIG. 8 is an oblique perspective view of the heat exchanger plates 2 stored in a case member 33 in Example 1.

FIG. 8 illustrates a mounting state of the heat exchanger plates 2 in EXAMPLE 1. The plurality of stacked heat exchanger plates 2 is installed in the housing formed by the cover members 31 and 32 and the case member 33. In FIG. 8, the case member 33 is depicted in a transparent manner and illustrates only the lowermost heat exchanger plate 2 in the case member 33. The heat exchanger plates 2 are stacked to form the core unit 12 as illustrated in FIG. 3. Flow chambers 38 in which the second heating medium m2 is movable in the stacking direction z are provided between the core unit 12 including the plurality of heat exchanger plates 2 and the case member 33. The flow chambers 38 are formed in portions that do not project in the width direction y of the projecting portions 217 and 227 of the heat exchanger plates 2. The second heating medium m2 that has entered through the second inlet 36 enters the flow chamber 38, then branches, and passes between the plurality of heat exchanger plates 2. The flows of the second heating medium m2 then merge in the flow chamber 38, and flow out of the second outlet 37. The first heating medium m1 flows through the communication holes 215 and 225 in the projecting portions 217 and 227, and the portions that do not project from the flow path forming portion 23 in the circulation direction x are formed as the flow chambers 38. The second heating medium m2 flows in the stacking direction z in the flow chambers 38.

Figure 9:
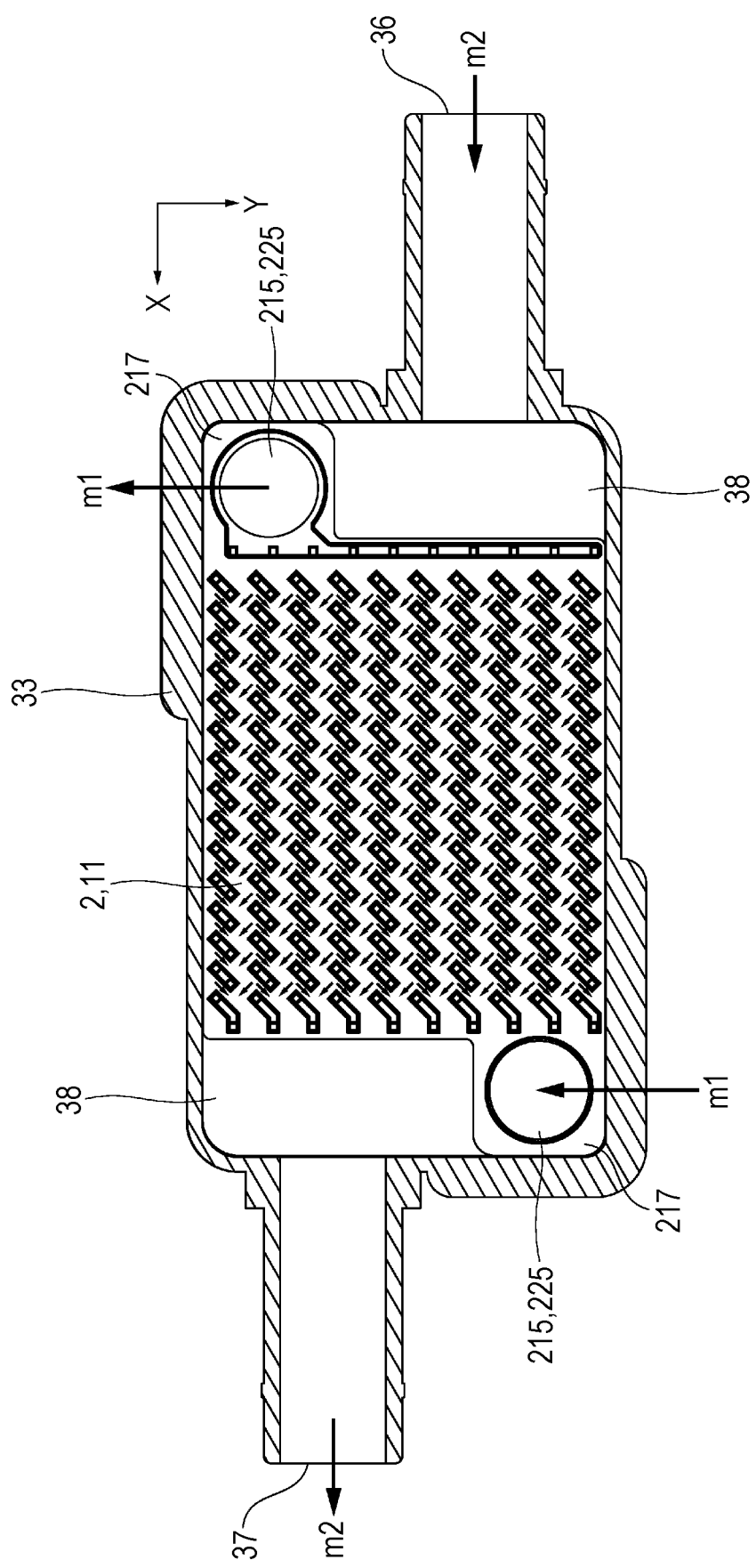
FIG. 9 is the heat exchanger plate 2 stored in the case member 33 in Example 1.

FIG. 9 is a diagram of the heat exchanger 1 of FIG. 8 in cross section in a plane in the circulation direction x-width direction y as viewed in the stacking direction z, and illustrates the top surface of the heat exchanger plate 2 stored in the case member 33. It is configured in such a manner that the inner peripheral portion of the case member 33 is in substantially intimate contact with the outer peripheral portion of the heat exchanger core 11 except the flow chambers 38. The first heating medium m1 then flows through the heat exchanger plates 2, and the second heating medium m2 flows outside the heat exchanger plates 2. Small arrows illustrated in FIG. 9 indicate the flows of the second heating medium m2 outside the heat exchanger plates 2. The second heating medium m2 enters through the second inlet 36 and branches from the flow chamber 38 to gaps between the heat exchanger plates 2. The branching and merging of the flows of the second heating medium m2 is repeated between the flow path bulging portions 211 and 221 that bulge outward, as indicated by the arrows, and the second heating medium m2 flows outside the heat exchanger plates 2 while meandering. The second heating medium m2 flows between two adjacent heat exchanger plates 2. The flows of the second heating medium m2 then merge in the flow chamber 38 and flow out of the second outlet 37.

A large area for heat exchange can be obtained by many flow path bulging portions 211 and 221 that are provided. Moreover, a line (not illustrated) linking the second inlet 36 and the second outlet 37 at the diagonal corners, and a line (not illustrated) linking the two projecting portions 217 at the diagonal corner portions are in a relationship of intersecting with each other. Hence, the flow chambers 38 can be formed, avoiding the projecting portions 217. Furthermore, the second inlet 36 and the second outlet 37 are in the diagonal positions. Therefore, the second heating medium m2 flows through the gaps in the heat exchanger core 11 evenly. Moreover, in FIG. 9, the first heating medium m1 and the second heating medium m2 flow in opposite directions in the circulation direction x. Therefore, heat is efficiently exchanged.

Figure 10:
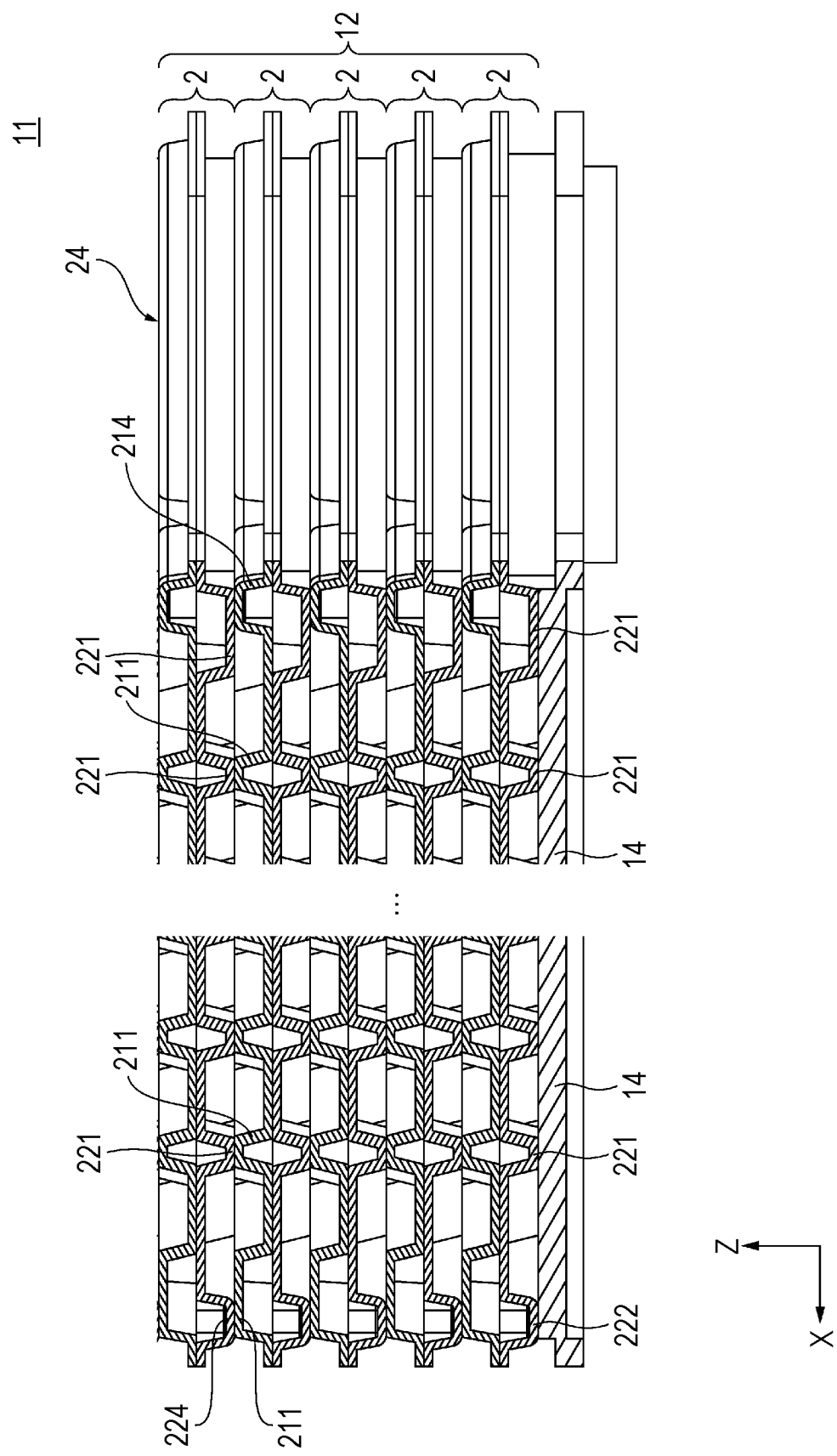
FIG. 10 is a cross-sectional view of a lower part of the heat exchanger core 11 in Example 1.

FIG. 10 is a cross-sectional view of the heat exchanger core 11. Only the configuration of the lower part of the heat exchanger core 11 is illustrated. The expanded portion bulging portions 214 and the flow path bulging portions 211 are partially in contact with the expanded portion bulging portions 224 and the flow path bulging portions 221 of the adjacent heat exchanger plates 2 above. Moreover, the lower end plate 14 is in contact with the expanded portion bulging portion 224 and the flow path bulging portions 221 of the lower plate 22 of the lowermost heat exchanger plate 2 of the core unit 12. Although not illustrated, the same applies to the vicinity of the upper end plate 13 in the upper part of the heat exchanger core 11. The upper end plate 13 is in contact with the top surfaces of the expanded portion bulging portion 214 and the flow path bulging portions 211 of the uppermost upper plate 21 of the core unit 12. The adjacent heat exchanger plates 2 are also in contact with each other as in the lower part. High pressure tightness can be obtained for the heat exchanger core 11 by bringing a part of the bulging portion into contact with a part of the bulging portion of the adjacent plate or a part of the end plate.

Figure 11:
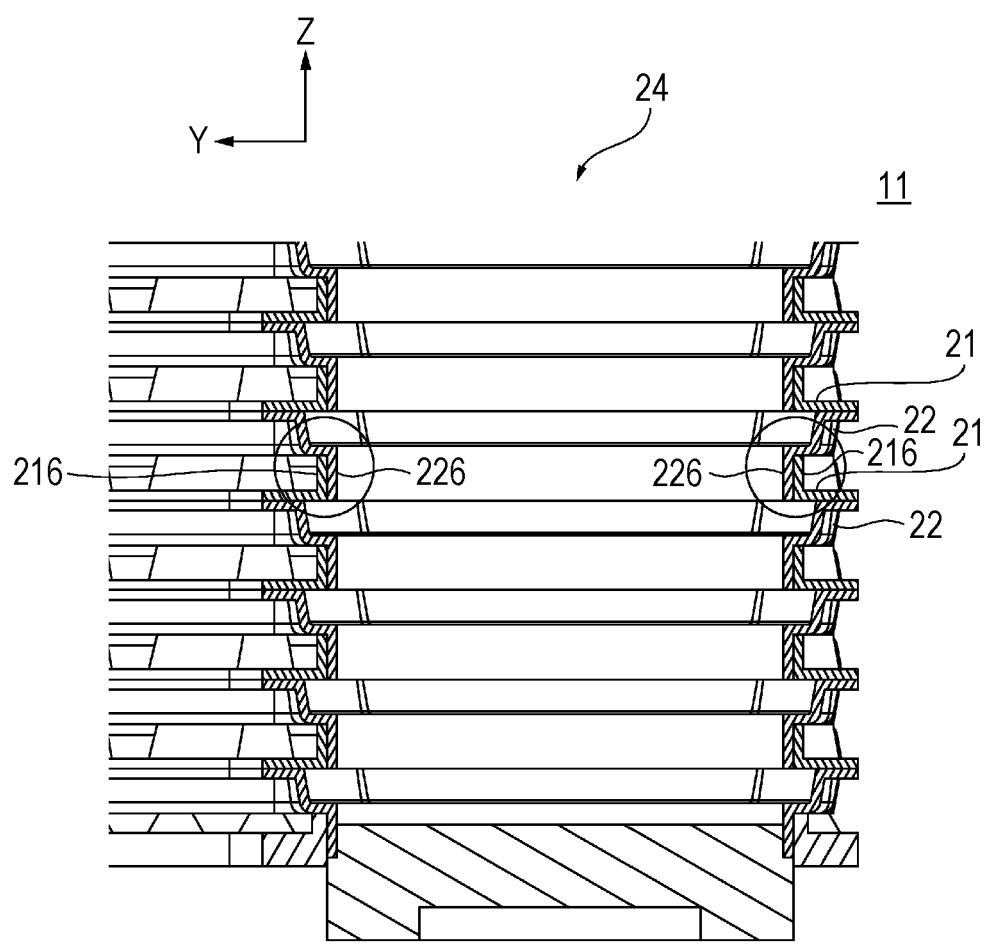
FIG. 11 is a cross-sectional view of a header portion 24 in Example 1.

FIG. 11 illustrates a cross section of the header portion 24 of the heat exchanger core 11. As illustrated in circles, the cylindrical portion 216 of the upper plate 21 is located outside the cylindrical portion 226 of the lower plate 22 of the adjacent heat exchanger plate 2 to allow the cylindrical portion 226 to be stacked thereon. The radii of the cylindrical portions 216 and 226 are slightly different. Therefore, the cylindrical portion 216 and the cylindrical portion 226 are fitted to each other in this portions. This structure enables positioning for stacking the heat exchanger plates 2. Moreover, a high degree of tightness in the header portions 24 can be obtained by fitting. The fitted portions are fixed by brazing, and the first heating medium m1 and the second heating medium m2 are not mixed due to a leak from the header portions 24. Furthermore, each of the header portions 24 is twice as thick due to a double thickness of the cylindrical portions 216 and 226, high pressure tightness against, for example, leakage can be obtained.

Example 2

Figure 12:
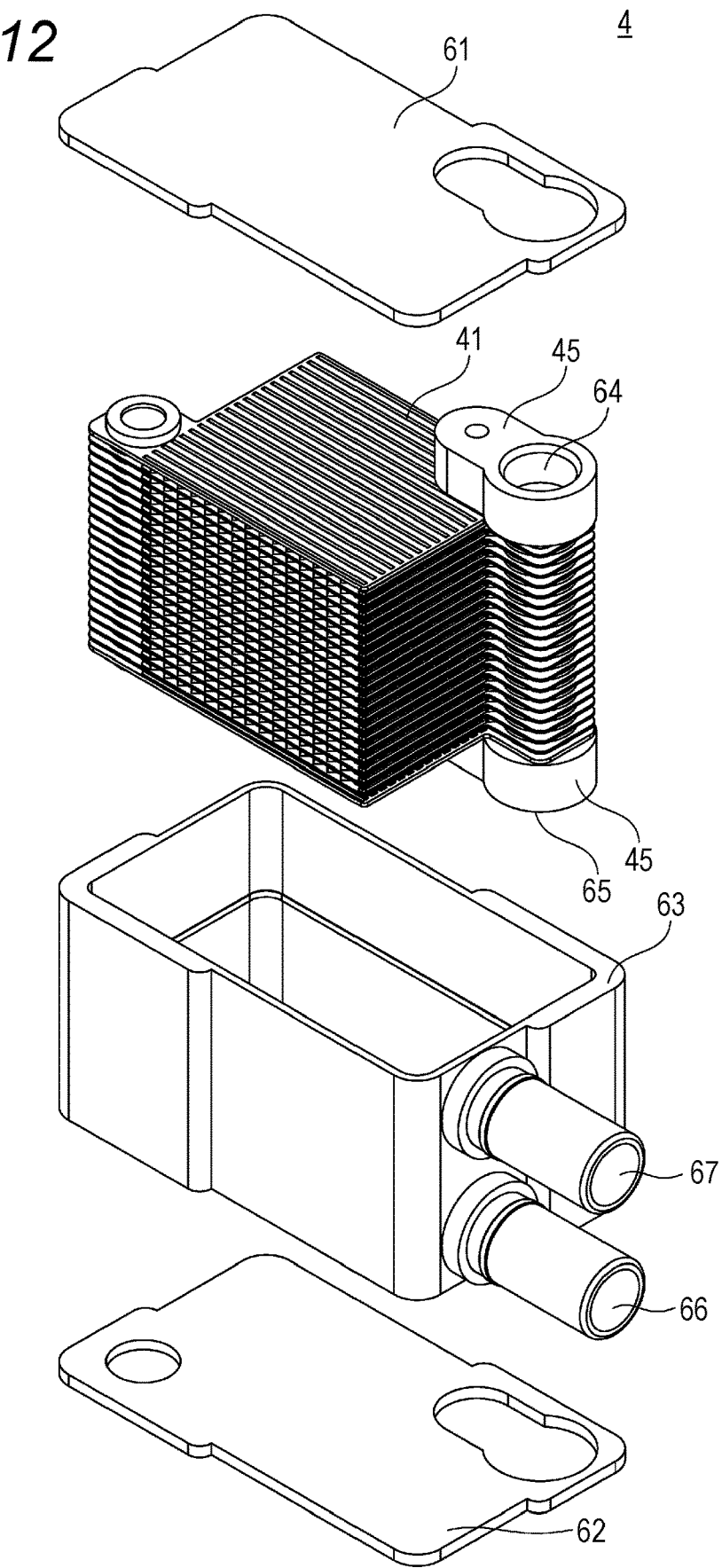
FIG. 12 is an exploded perspective view of a heat exchanger 4 in Example 2.

FIG. 12 is a diagram of a disassembled heat exchanger 4 of Example 2 as viewed obliquely from above. In Example 2, a first inlet 64 and a first outlet 65 are provided at two ends of the heat exchanger 4 in the stacking direction z, and a second inlet 66 and a second outlet 67 are provided to the heat exchanger 4, aligned in the same direction in the circulation direction x. As in Example 1, a heat exchanger core 41 is installed in a tubular case member 63. The top and bottom of the case member 63 are closed with an upper cover member 61 and a lower cover member 62 to form a case. The case member 63, the upper cover member 61, and the lower cover member 62 are made of resin. Moreover, aluminum components are integrated into the heat exchanger core 41 by brazing. The first inlet 64 through which a first heating medium m1 flows in and the first outlet 65 through which the first heating medium m1 flows out are provided in the upper and lower parts of the heat exchanger core 41, and are provided on opposite surfaces across the case member 63. Therefore, each of the upper cover member 61 and the lower cover member 62 is provided with a hole through which a pad 45 passes. Moreover, the second inlet 66 through which a second heating medium m2 flows in, and the second outlet 67 are provided, aligned in the stacking direction z, on the same side surface, which is close to the first inlet 64 and the first outlet 65, of the tubular case member 63.

Figure 13:
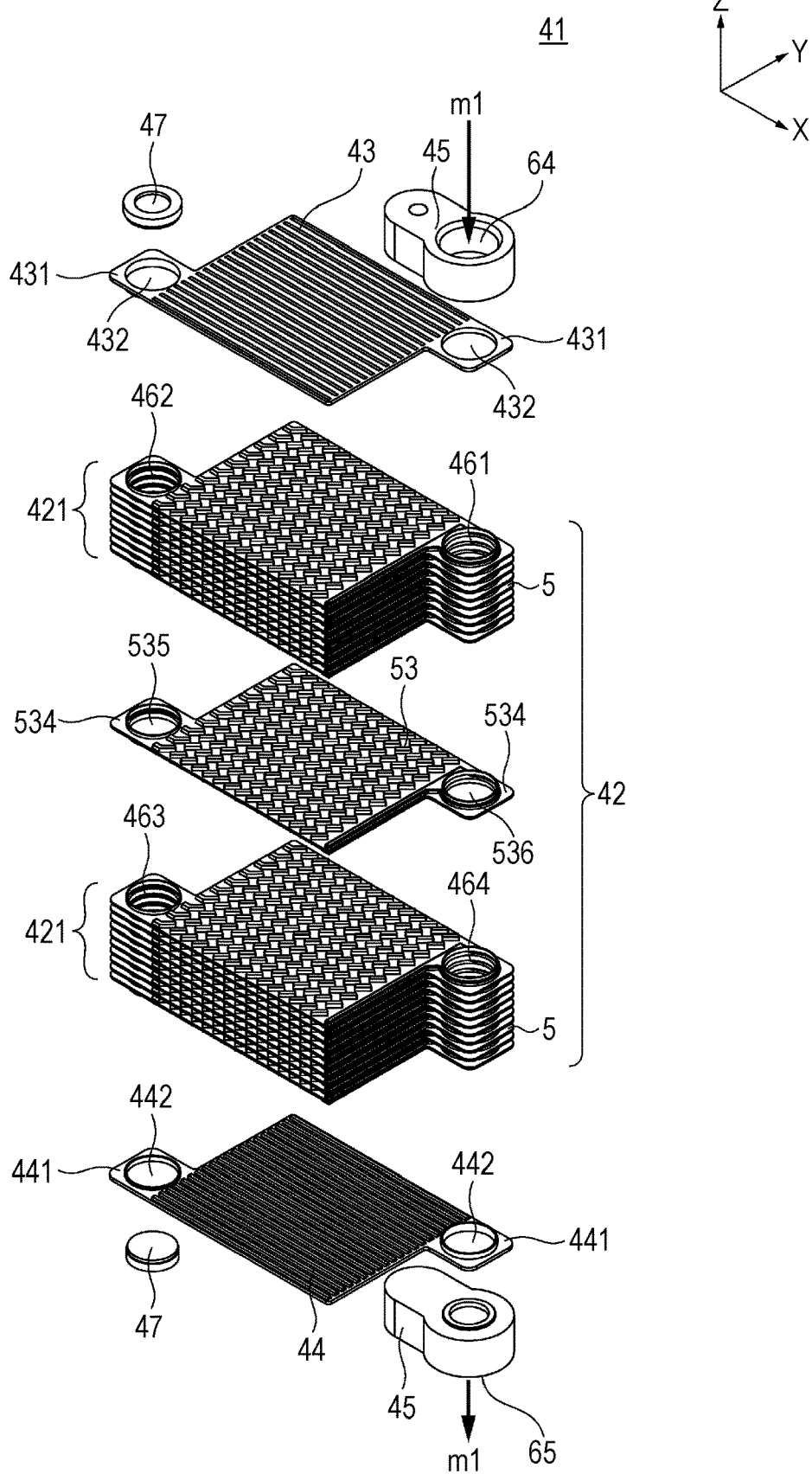
FIG. 13 is an exploded perspective view of a heat exchanger core 41 in Example 2.

FIG. 13 is a diagram of the disassembled heat exchanger core 41 of Example 2 as viewed obliquely from above. The pad 45 is provided on each side of the heat exchanger core 41 in the stacking direction z. Moreover, the two pads 45 are provided at the same corner in the circulation direction x and the width direction y. A core unit 42 includes two sub-core units 421 in which heat exchanger plates 5 are stacked, and one partition plate 53. The heat exchanger plates 5 have the same configuration as the heat exchanger plates 2 of Example 1. The partition plate 53 is sandwiched between the two sub-core units 421. The partition plate 53 includes a closed portion 536 where a communication hole is blocked by a cap to prevent the first heating medium m1 from passing through the closed portion 536, in one of projecting portions 534 at the corners where the pads 45 lie. A communication hole 535 is bored in the other projecting portion 534 that is far from the corner where the pad 45 lies. The pad 45 is mounted on one of holes 432 in two projecting portions 431 of an upper end plate 43, and the other hole 432 is closed with a cap 47. The same applies to holes 442 in a lower end plate 44. In the core unit 42, a header bulging portion of the heat exchange plate 2 and a header flat portion of its adjacent heat exchanger plate 5 are stacked in such a manner as to face each other.

The first heating medium m1 that has flown in through the first inlet 64 enters a conduction hole 461 in the upper part of the core unit 42, and branches into a plurality of the heat exchanger plates 5 in the upper sub-core unit 421. At this point in time, the closed portion 536 of the partition plate 53 does not allow the first heating medium m1 to flow directly to a conduction hole 464 in the lower part. The closed portion 536 of the partition plate 53 has a structure in which the upper plate has a hole and the lower plate is blocked by the cap, and is otherwise the same as the heat exchanger plates 5. Therefore, heat exchange flow paths are formed also in the partition plate 53 through which the first heating medium m1 flows. The first heating medium m1 that has passed through the heat exchanger plates 5 and the partition plate 53 reaches a conduction hole 462 on the opposite side. The first heating medium m1 then flows to the lower part through the communication hole 535 of the partition plate 53. The first heating medium m1 enters the plurality of the heat exchanger plates 5 in the sub-core unit 421 in the lower part through a conduction hole 463 in the lower part. The first heating medium m1 flows through the heat exchange flow paths of the heat exchanger plates 5 in a direction opposite to the direction in the upper part. The first heating medium m1 flows out of the first outlet 65 through the conduction hole 464.

Figure 14:
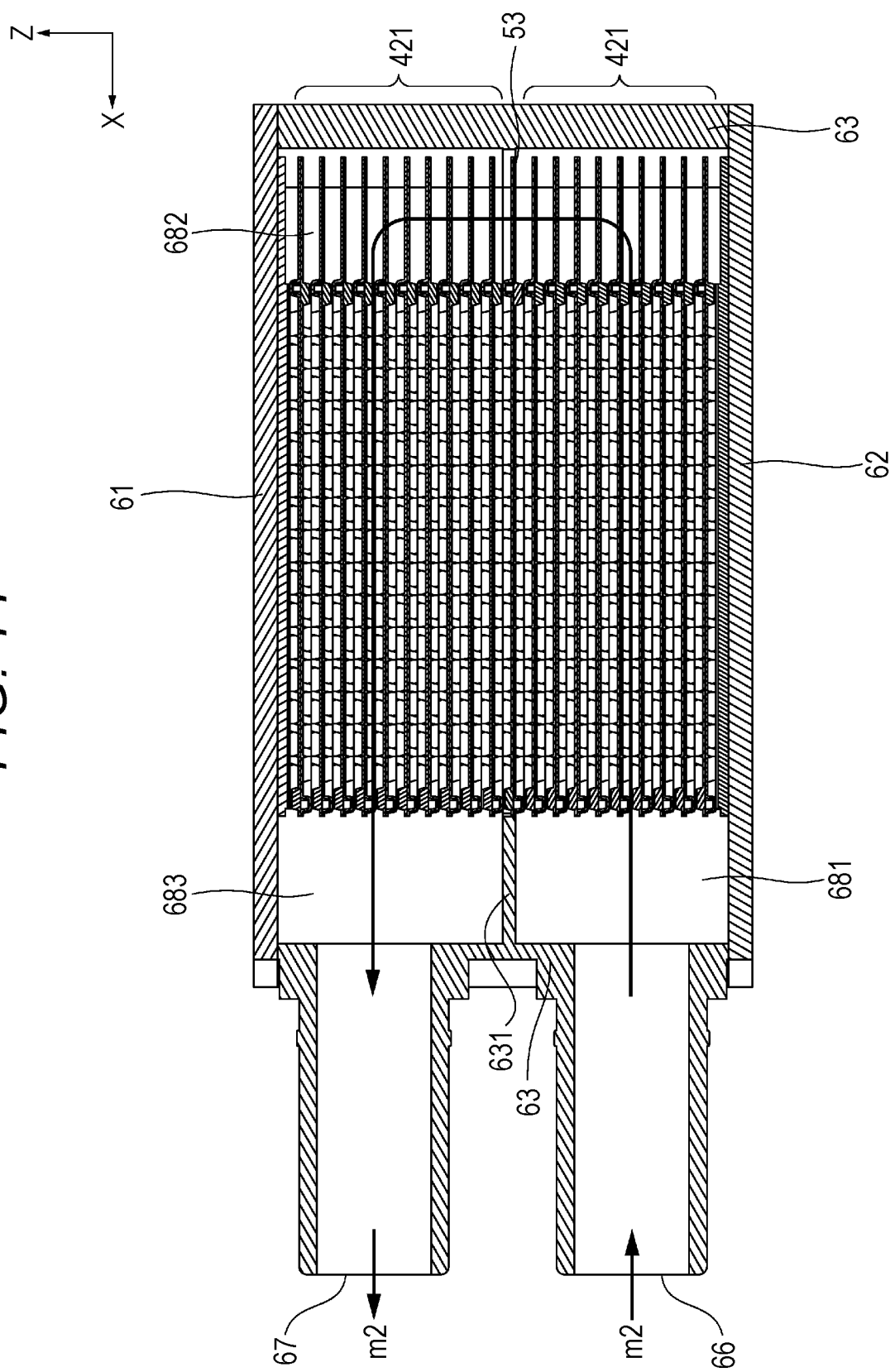
FIG. 14 is the flow of a second heating medium m2 in Example 2.

FIG. 14 illustrates the flow of the second heating medium m2 within the heat exchanger 4 of Example 2. Arrows indicate the flow of the second heating medium m2. The case member 63 is provided therein with a partition portion 631 substantially parallel to a plane of the plate where the partition plate 53 extends, in a middle position in the stacking direction z, and is divided by the partition portion 631 into two flow chambers 681 and 683. Moreover, the top and bottom of the case member 63 are blocked by the upper cover member 61 and the lower cover member 62 to form the case. The second heating medium m2 that has entered through the second inlet 66 provided in the lower part of the heat exchanger 4 reaches the flow chamber 681. The upper part of the flow chamber 681 is closed with the partition portion 631. Therefore, the second heating medium m2 branches and flows between the heat exchanger plates 5 in the sub-core units 421 below the partition portion 631. The flows of the second heating medium m2 then merge in a flow chamber 682 and flow upward. In FIG. 14, a plurality of the plates illustrated in the flow chamber 682 is on the back side, and the second heating medium m2 can flow in the stacking direction z in the flow chamber 682. The second heating medium m2 flows between the heat exchanger plates 5 of the upper sub-core unit 421, and the flows merge in the flow chamber 683 above the partition portion 631, and flow out of the second outlet 67. In terms of the flow path of the second heating medium m2, the flow chambers 681 and 683 are separated by the partition portion 631 in the stacking direction z, and the second heating medium m2 flows in opposite directions across the partition portion 631 in the heat exchanger core 41. Also in Example 2, the first heating medium m1 and the second heating medium m2 flow in the opposite directions in the sub-core units 421, which offers good heat exchange efficiency.

In Example 2, the partition portion 631 is provided in the middle position in the stacking direction z in the case member 63. However, the partition portion 631 may be provided in any position in the stacking direction z. The position is preferably provided in the same position as the partition plate. In Example 2, the number of the partition plates is one. However, it is desirable to provide a plurality of partition plates when the number of stacked heat exchanger plates is large. In this case, it is preferable that the partition portions 631 of the case member 63 are provided in such a manner as to be equal in number and height in the z-direction to the partition plates. If there are two partition plates, the other partition portion is provided in the flow chamber 682, and the second inlet and the second outlet are provided on opposing surfaces of the case member.

Example 3

Figure 15:
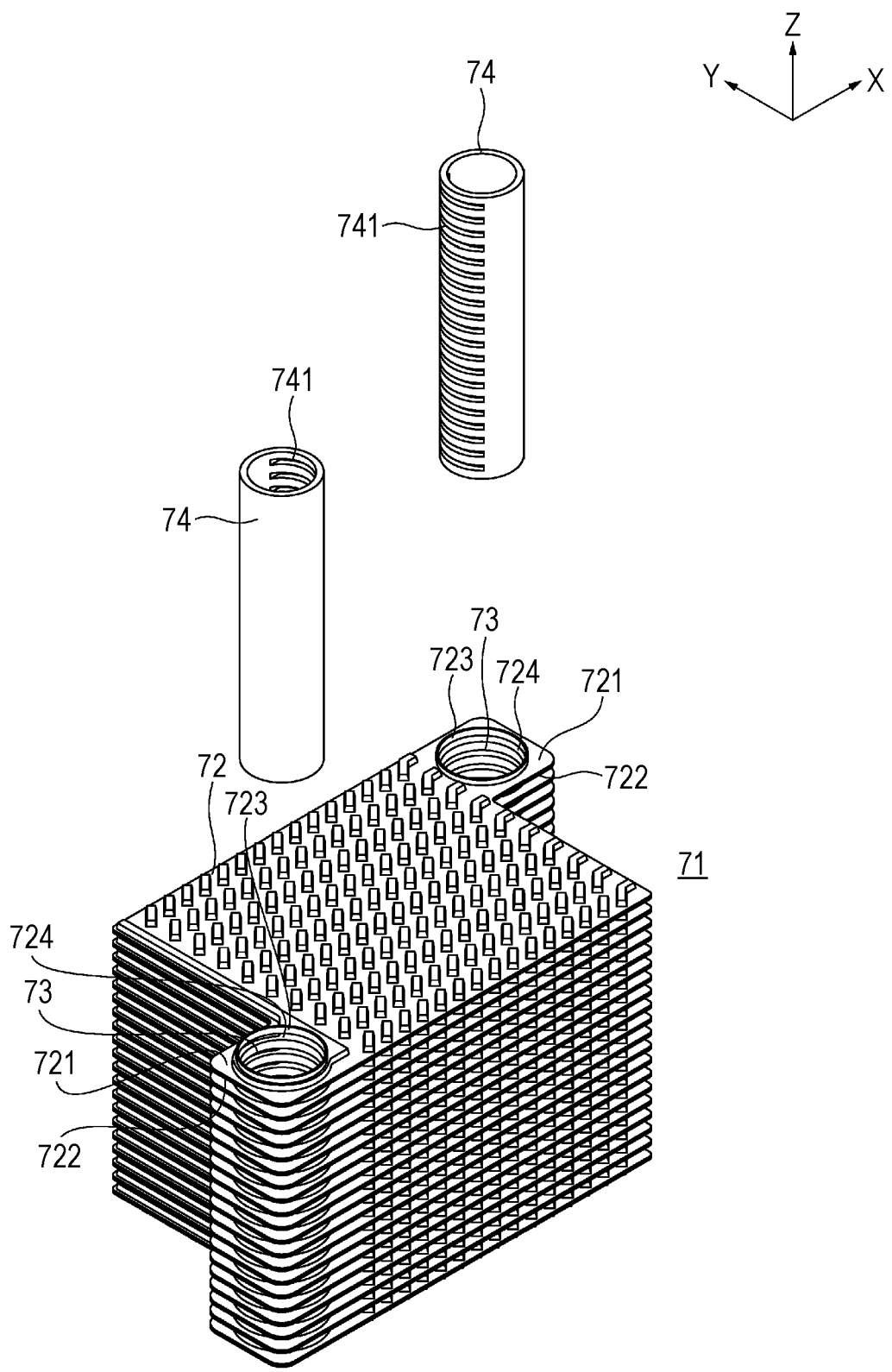
FIG. 15 is a partial exploded perspective view of a core unit 71 in Example 3.

FIG. 15 is a partial exploded view of a core unit 71 of a heat exchanger 7 (not illustrated) of Example 3. In the core unit 71, a plurality of heat exchanger plates 72 is stacked. In Example 3, a tubular member 74 of an approximately cylindrical shape is inserted as a reinforcing member into each of conduction holes 73 formed by holes bored in projecting portions 721 and 722. The heat exchanger 7 is the same as the heat exchanger 1 of Example 1 except for the configuration of the tubular members 74. Each of the tubular members 74 is provided in the stacking direction z with a plurality of hole portions 741 that is horizontally long and parallel to the plane in the circulation direction x and the width direction y. The hole portions 741 are provided in a direction where flow paths of the first heating medium m1 are formed. The each of the tubular members 74 is provided with the plurality of horizontally long hole portions 741 aligned in the stacking direction z, aligned with the flow paths of the heat exchanger plates 72. The tubular members 74 are substantially in contact with the inner peripheral surfaces of cylindrical portions 723 and 724 provided in communication holes of the projecting portions 721 and/or the projecting portions 722 that are the inner peripheral surfaces of the conduction holes 73, and are brazed. Hence, high strength can be obtained in the core unit 71. Moreover, the tubular members 74 serve as guides to stack the plurality of heat exchanger plates 72 for assembly. Therefore, an improvement in productivity is promoted. At this point in time, the outer shape of the each of the tubular members 74 is made slightly smaller than the inner diameter of each of header portions to reduce resistance that is generated when the heat exchanger plates 72 are stacked and to promote an improvement in assemblability. Furthermore, after the heat exchanger plates 72 are stacked, the tubular members 74 are increased in diameter, thereby filling gaps between the tubular members 74 and the header portions to enable securing a fit, and fixing the heat exchanger plates 72. Therefore, an improvement in productivity is further promoted. As a modification, members having a shape obtained by connecting the hole portions 741 in the stacking direction z and cutting away a part of the cylinder, the members having a C shape as viewed in the stacking direction, may be used instead of the tubular members 74.

Example 4

Figure 16:
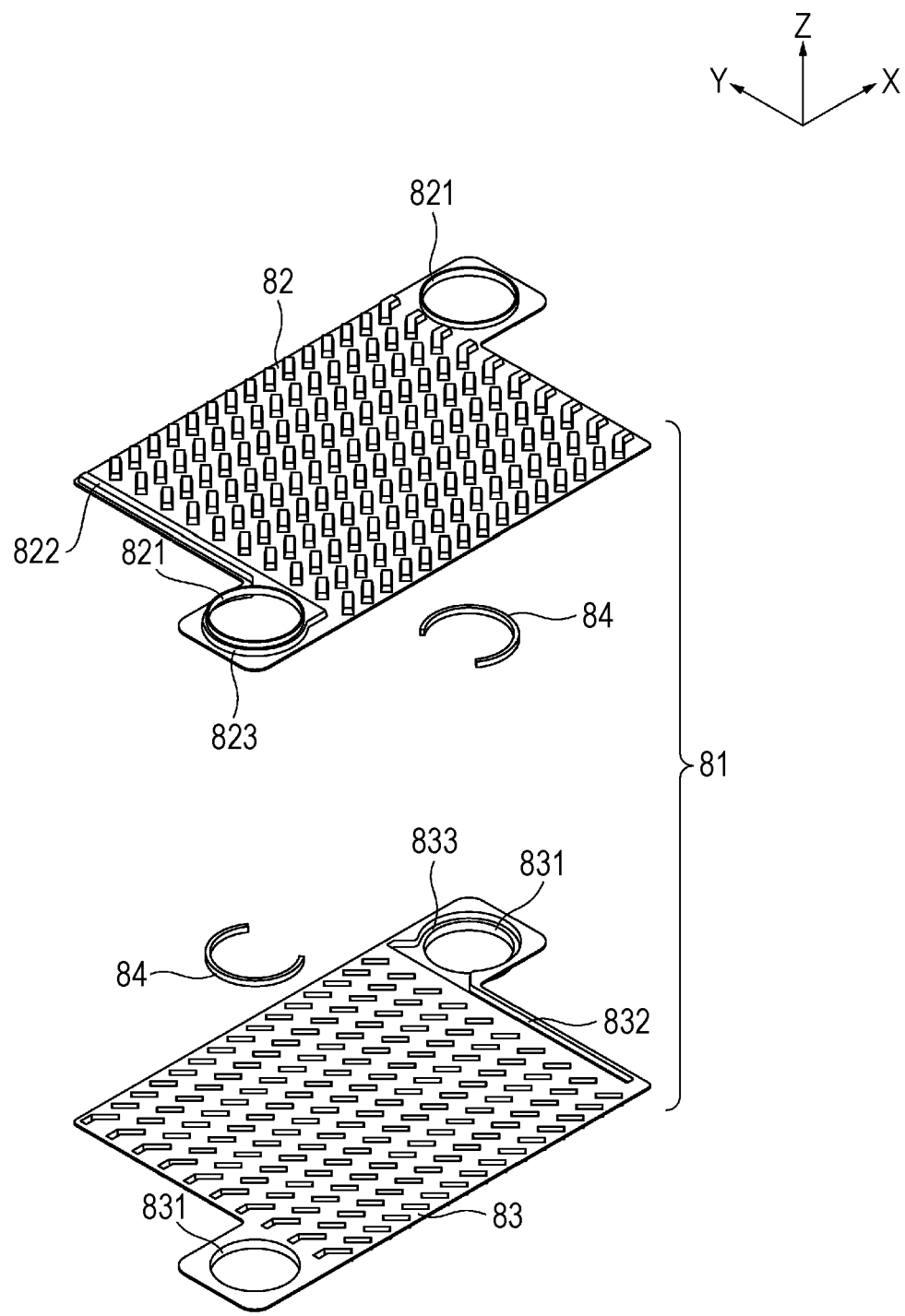
FIG. 16 is an exploded perspective view of a heat exchanger plate 81 in Example 4.

FIG. 16 is an exploded view of a heat exchanger plate 81 of a heat exchanger 8 (not illustrated) of Example 4. The heat exchanger 8 is the same as the heat exchanger 1 of Example 1 except for the use of C-shaped C-shaped members 84 as reinforcing members. As in Example 1, an upper plate 82 (the first plate member) is stamped upward and provided with cylindrical portions 821, an expanded portion bulging portion 822, and a hole surrounding bulging portion 823, and a lower plate 83 (the second plate member) is stamped downward and provided with cylindrical portions 831, an expanded portion bulging portion 832, and a hole surrounding bulging portion 833. The C-shaped members 84 are inserted into the hole surrounding bulging portions 823 and 833 in a direction that is open to the expanded portion bulging portions 822 and 832. The C-shaped members 84 are then brazed to the upper plate 82 and the lower plate 83 with the upper plate 82 and the lower plate 83 laid on top of each other. In Example 4, the C-shaped members 84 join the portions of the hole surrounding bulging portions 823 and 833 firmly, and the thickness of their side increases. Therefore, high strength against the pressure of the first heating medium m1 can be obtained.

Example 5

Figure 17:
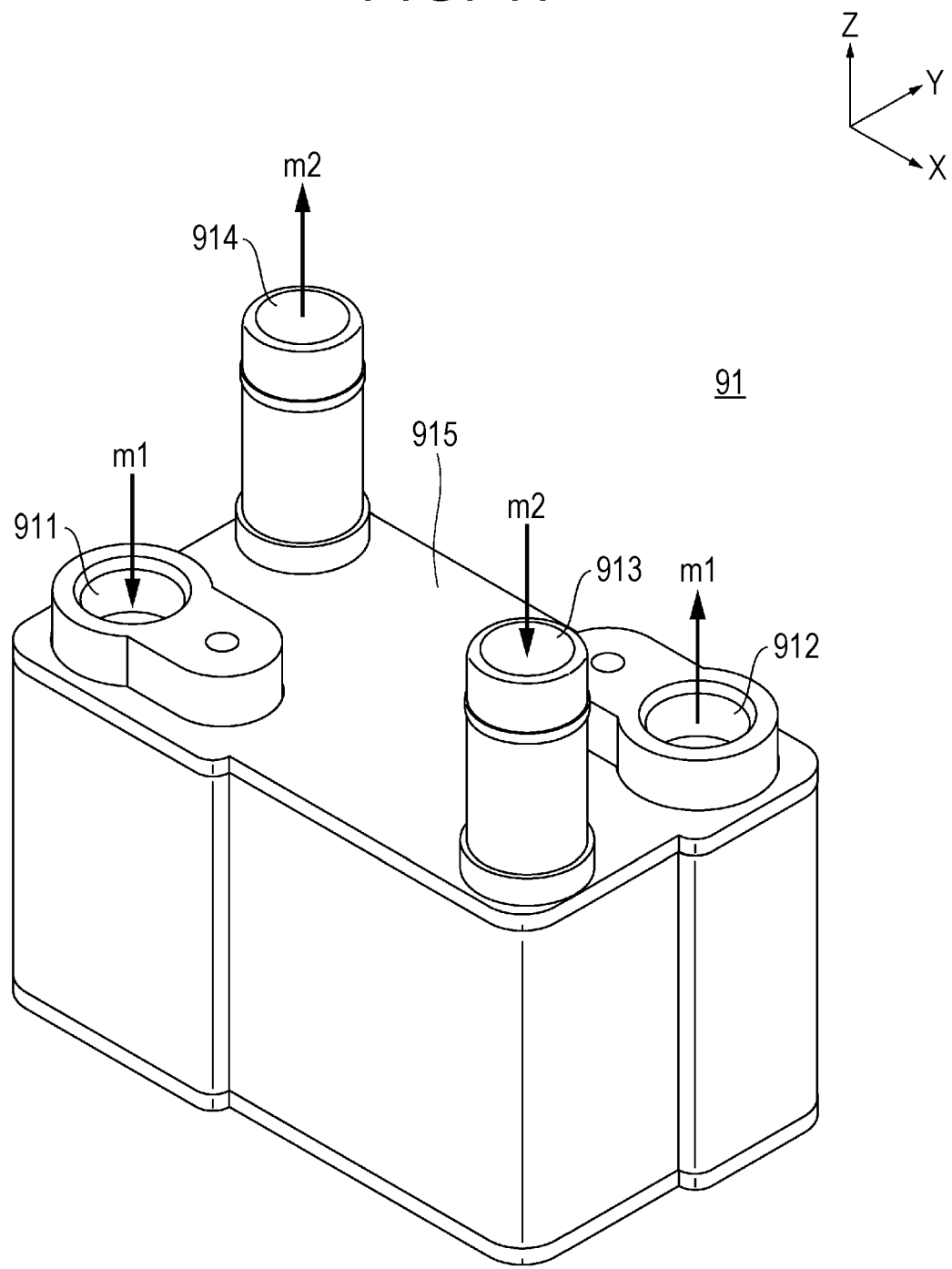
FIG. 17 is a perspective view of a heat exchanger 91 in Example 5.

FIG. 17 illustrates a mounting state of inlets and outlets in Example 5. In a heat exchanger 91 of Example 5, all of a first inlet 911, a first outlet 912, a second inlet 913, and a second outlet 914 are mounted on an upper cover member 915. The other points are the same as the heat exchanger 1 of Example 1. When the heat exchanger 9 is incorporated into an apparatus, all pipes mounted on the first inlet 911, the first outlet 912, the second inlet 913, and the second outlet 914 face in the same direction. Therefore, it is possible to promote a reduction in the size of the apparatus.

Example 6

Figure 18:
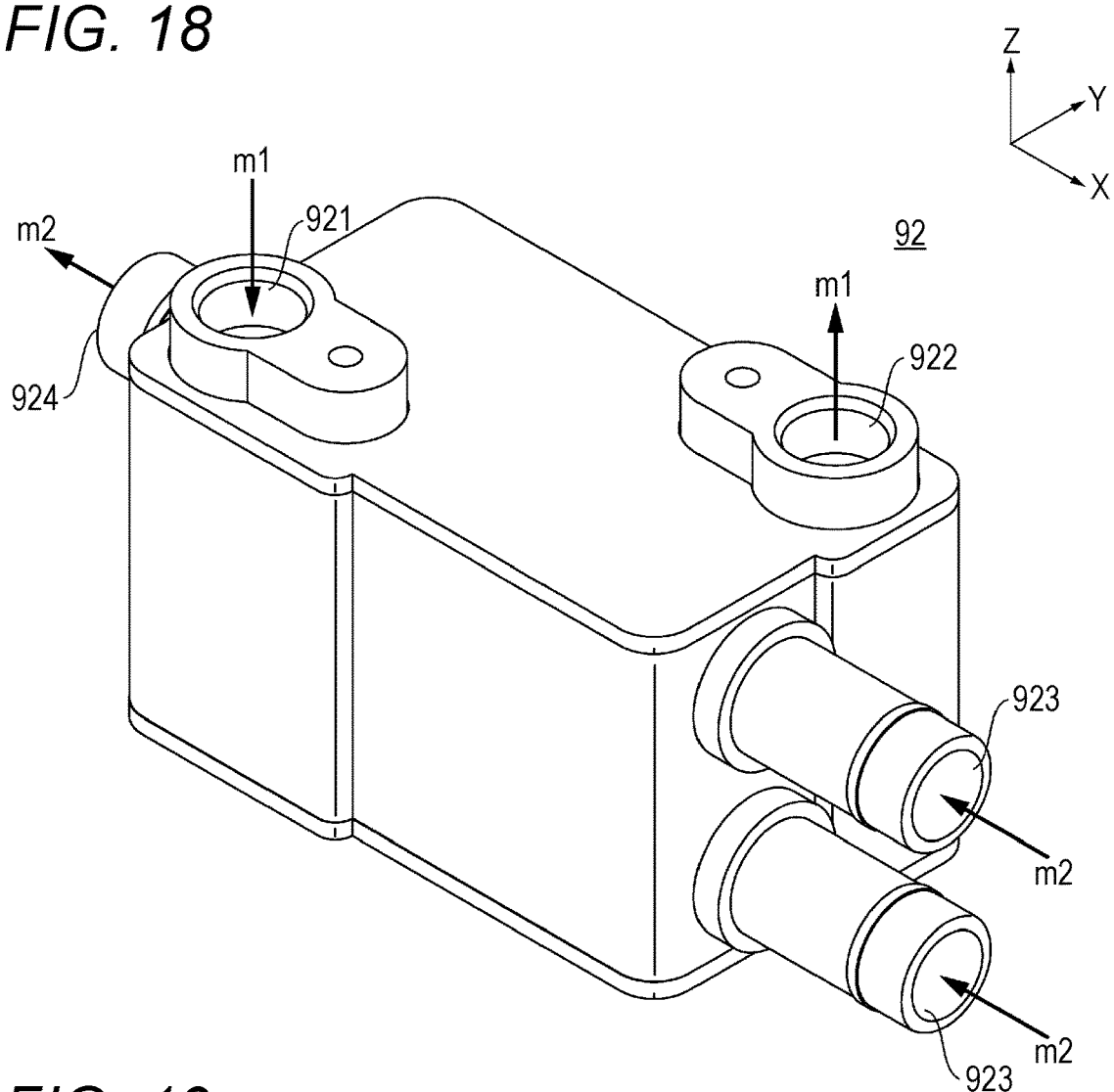
FIG. 18 is a perspective view of a heat exchanger 92 in Example 6.

FIG. 18 illustrates a mounting state of inlets and outlets of a heat exchanger 92 in Example 6. The heat exchanger 92 of Example 6 is provided with two second outlets 923 in contrast to Example 1. The other configurations including a first inlet 921, a first outlet 922, and a second outlet 924 are the same as the heat exchanger 1 of Example 1. In Example 6, when the heat exchanger 92 is incorporated into an apparatus, a second heating medium m2 can flow in from a plurality of cooling or heating targets without providing branch portions on the outside are not provided. Moreover, the example in which two inlets and one outlet are provided in the x-direction appears in Example 6. However, the present invention is not limited to this. A configuration in which a plurality of inlets and a plurality of outlets are provided may be adopted, and also in terms of the directions, the inlets and the outlets can protrude in any directions of the x-direction, the y-direction, and the z-direction.
<Others>

In the header portions in Examples above, one header bulging portion is formed on each of the upper plate (the first plate member) and the lower plate (the second plate member). However, two header bulging portions may be provided on one of the upper plate and the lower plate. On the left side (outflow side) of FIG. 6 (b), the flow path bulging portions 221 are located away from the communication holes 215 and 225, and the second heating medium m2 flows, avoiding the cylindrical portions 216 and 226 connecting the heat exchanger plates 2, due to the inclination of the flow path bulging portions 221. The two header bulging portions are provided on one of the upper plate and the lower plate, thereby it is possible to similarly create the flow of the second heating medium m2, avoiding the cylindrical portions 216 and 226 also on the right side (inflow side).

Figure 19:
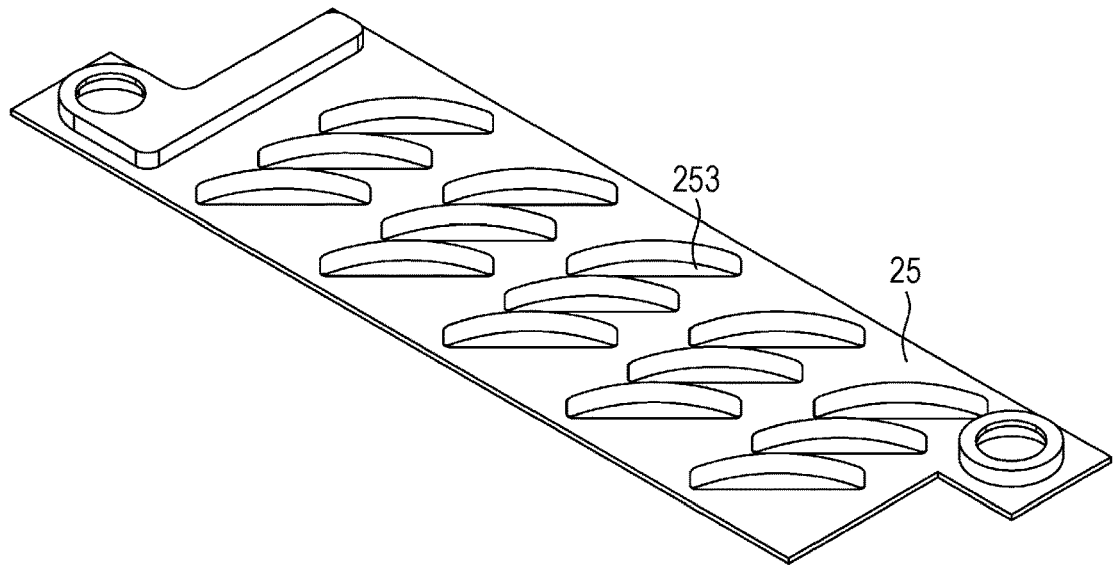
FIG. 19 is a perspective view for explaining approximately arcuate flow path bulging portions 253.

Moreover, the upper flow path bulging portions and the lower flow path bulging portions in Examples above bulge outward in a substantially rectangular cuboid shape, but may bulge outward in an approximately arcuate shape or other shapes. FIG. 19 is a diagram of an upper plate 25 (the first plate member) as viewed obliquely to explain approximately arcuate flow path bulging portions. In Example 1, the flow path bulging portions having an approximately rectangular cuboid shape has been described in FIG. 5. However, flow path bulging portions having an approximately arcuate shape are described in FIG. 19. The upper plate 25 includes arcuate flow path bulging portions 253 that bulge outward in an approximately arcuate shape with a predetermined width. The other points are the same as the upper plate 21 of Example 1. Although not illustrated, a lower plate having approximately arcuate flow path bulging portions similar to the upper plate 25 can be used. In this manner, a first heating medium m1 flows smoothly, and flow resistance can be reduced.

In Examples, as illustrated in FIG. 6 (b), the projecting portions 217 and 227 and the communication holes 215 and 225 are located at the diagonal corners at the ends in the width direction y. However, if the projecting portions 217 and 227 and the communication holes 215 and 225 are formed at the ends on the same side in the width direction y, the upper plate can be used as the lower plate by being turned upside down and then rotated 180° about the stacking direction z. Moreover, if the projecting portions 217 and 227 and the communication holes 215 and 225 have symmetrical shapes in the width direction y by, for example, being located in the middle in the width direction y or located at two ends in the width direction y, the upper plate and the lower plate can have the same shape. If the upper and lower plates have the same shape, the manufacturing cost can be reduced.

Moreover, the upper flow path bulging portions and the lower flow path bulging portions in Examples above extend obliquely in a straight line in a plane in the circulation direction x and in the width direction y. However, the flow path bulging portions extending in an arc shape in the longitudinal direction may be continuous as arcs that curve in opposite directions. If the upper flow path bulging portions and the lower flow path bulging portions are placed in such a manner that their arcs are connected without a bend, flow resistance can be suppressed.

In Examples above, the outside of the heat exchanger core is coated with resin. However, the coating may be a plating. Coating with resin or a plating enables preventing deterioration of the heat exchanger core due to the second heating medium such as water. The outside of the heat exchanger core may not be coated. Moreover, the heat exchanger core may be made of metal such as stainless steel or titanium, or resin.

In, for example, Example 1, the second inlet 36 and the second outlet 37, which are the inlet and the outlet of the second heating medium m2, are provided to the opposing surfaces of the case member 33. Moreover, in Example 2, the second inlet 66 and the second outlet 67 are provided to the same surface of the case member 33. In Example 6, the second inlet 913 and the second outlet 914 are provided to the upper cover member 915. However, the second inlet and the second outlet may be provided to any outer surface of the approximately hexahedral shape of the case including the case member and the cover members.

In Examples above, the covers covering the heat exchanger core are made of resin, but may be made of metal such as stainless steel or aluminum. In the case of aluminum, integral brazing can be performed simultaneously with the heat exchanger core. Therefore, an improvement in productivity is promoted.

Moreover, in Examples above, for example, the flow path bulging portions are formed by stamping the upper and lower surfaces of the plate to bulge upward or downward. However, bulging portions including protrusions and recesses may be formed by another method.

LIST OF REFERENCE SIGNS

X Circulation direction
y Width direction
Z Stacking direction
m1 First heating medium
m2 Second heating medium
1 Heat exchanger
11 Heat exchanger core
12 Core unit
13 Upper end plate
131 Projecting portion
132 Hole
14 Lower end plate
141 Projecting portion
142 Hole
15 Pad
16 Cap
2 Heat exchanger plate
21 Upper plate
211 Flow path bulging portion
212 Header bulging portion
213 Hole surrounding bulging portion
214 Expanded portion bulging portion
215 Communication hole
216 Cylindrical portion
217 Projecting portion
218 Header flat portion
22 Lower plate
221 Flow path bulging portion
222 Header bulging portion
223 Hole surrounding bulging portion
224 Expanded portion bulging portion
225 Communication hole
226 Cylindrical portion
227 Projecting portion
228 Header flat portion
23 Flow path forming portion
24 Header portion
241 Hole surrounding portion
242 Flow path forming portion-side expanded portion
25 Upper plate
253 Arcuate flow path bulging portion
31 Cover member
32 Cover member
33 Case member
34 First inlet
35 First outlet
36 Second inlet
37 Second outlet
38 Flow chamber
4 Heat exchanger
41 Heat exchanger core
42 Core unit
421 Sub-core unit
43 Upper end plate
431 Projecting portion
432 Hole
44 Lower end plate
441 Projecting portion
442 Hole
45 Pad
461 Conduction hole
462 Conduction hole
463 Conduction hole
464 Conduction hole
47 Cap
5 Heat exchanger plate
53 Partition plate
534 Projecting portion
535 Communication hole
536 Closed portion
61 Upper cover member
62 Lower cover member
63 Case member
631 Partition portion
64 First inlet
65 First outlet
66 Second inlet
67 Second outlet
681 Flow chamber
682 Flow chamber
683 Flow chamber
7 Heat exchanger
71 Core unit
72 Heat exchanger plate
721 Projecting portion
722 Projecting portion
723 Cylindrical portion
724 Cylindrical portion
73 Conduction hole
74 Tubular member
741 Hole portion
8 Heat exchanger
81 Heat exchanger plate
82 Upper plate
821 Cylindrical portion
822 Expanded portion bulging portion
823 Hole surrounding bulging portion
83 Lower plate
831 Cylindrical portion
832 Expanded portion bulging portion
833 Hole surrounding bulging portion
84 C-shaped member
91 Heat exchanger
911 First inlet
912 First outlet
913 Second inlet
914 Second outlet
915 Upper cover member
92 Heat exchanger
921 First inlet
922 First outlet
923 Second inlet
924 Second outlet

The invention claimed is:
1. A heat exchanger comprising: a heat exchanger core through which a first heating medium flows; and a case covering the heat exchanger core, the heat exchanger being configured to exchange heat between the first heating medium and a second heating medium flowing between the outside of the heat exchanger core and the inside of the case, wherein
the heat exchanger core includes a core unit in which a plurality of heat exchanger plates each obtained by laying a first plate member and a second plate member on top of each other are stacked in a stacking direction, each of the heat exchanger plates includes a flow path forming portion and a header portion, each of the flow path forming portions includes a plurality of flow path bulging portions that bulges outward of the heat exchanger plate and forms a heat exchange flow path of the first heating medium therein, each of the header portions includes a communication hole communicating with the header portion of the adjacent heat exchanger plate, and a flow path forming portion-side expanded portion expanding from the communication hole toward the flow path forming portion, each of the flow path forming portion-side expanded portions communicates with a plurality of the heat exchange flow paths, the each of the header portions includes either a header bulging portion bulging outward or a header flat portion that is flat, and in the core unit, the header bulging portion of the respective heat exchanger plate and the header flat portion of the adjacent heat exchanger plate are stacked in such a manner as to face each other, each of the flow path bulging portions is in contact with ether a corresponding header bulging portion or the header bulging portion of the adjacent heat exchanger plate, the plurality of flow path bulging portions includes:
a plurality of first flow path bulging portions bulging outward from the first plate member and extending in a first oblique direction between a circulation direction of the heat exchanger core and a width direction of the heat exchanger core, and a plurality of second flow path bulging portions bulging outward from the second plate member and extending in a second oblique direction between the circulation direction and the width direction, the second oblique direction intersecting the first oblique direction, and each of the plurality of first flow path bulging portions and each of the plurality of second flow path bulging portions overlaps at a first upstream end of the each of the plurality of first flow path bulging portions in the first oblique direction and at a second downstream end of the each of the plurality of second flow path bulging portions in the second oblique direction.

2. The heat exchanger according to claim 1, wherein in the header portion provided at each end of the flow path forming portion of the each of the heat exchanger plates, the header bulging portions are provided to only one of the first plate member and the second plate member.

3. The heat exchanger according to claim 1, wherein in the header portion provided at each end of the flow path forming portion of the each of the heat exchanger plates, the header bulging portion is provided to each of the first plate member and the second plate member.

4. The heat exchanger according to claim 1, wherein the communication holes are provided at diagonal corner portions of the each of the heat exchanger plates.

5. The heat exchanger according to claim 1, wherein the flow path bulging portions have an approximately rectangular cuboid or arcuate bulging shape, and each of the flow path bulging portions of the first plate member and the second plate member is substantially symmetrical in a longitudinal direction with respect to a circulation direction of the first heating medium.

6. The heat exchanger according to claim 1, wherein the heat exchanger core includes end plates at two ends of the core unit in the stacking direction, and the end plates are in contact with the header portions and/or the flow path bulging portions of the heat exchanger plates located at the two ends.

7. The heat exchanger according to claim 1, wherein an inner peripheral portion of the case is configured in such a manner as to be in contact with an outer peripheral portion of the heat exchanger core, and one or more inlets of the second heating medium and one or more outlets of the second heating medium are provided to an outer surface of the case.

8. The heat exchanger according to claim 7, wherein the case includes, therein, a partition portion substantially parallel to a plane of the plate where the heat exchanger plate extends, in any position in the stacking direction of the core unit, and a flow path of the second heating medium is partitioned by the partition portion in the stacking direction.

9. The heat exchanger according to claim 1, wherein the heat exchanger core includes: the heat exchanger plates; and a partition plate being the heat exchanger plate provided with a closed portion, and the partition plate is provided with the closed portion in the communication hole of at least one of the first plate member and the second plate member.

10. The heat exchanger according to claim 1, wherein the header portion includes a reinforcing member therein.

11. The heat exchanger according to claim 10, wherein a tubular member substantially in contact with inner peripheral surfaces of the stacked communication holes is inserted as the reinforcing member into the heat exchanger core, and the tubular member is provided with a plurality of hole portions aligned with a plurality of the header portions aligned in the stacking direction.

12. The heat exchanger according to claim 1, wherein each of the plurality of first flow path bulging portions bulges outward in an approximately arcuate shape with a predetermined width, and each of the plurality of second flow path bulging portions bulges outward in an approximately arcuate shape with a predetermined width.

13. The heat exchanger according to claim 1, wherein each of the plurality of first flow path bulging portions includes a first downstream end opposite the first upstream end in the first oblique direction, and the plurality of first flow path bulging portions are located away from each other in the circulation direction such that the first upstream end of one of the plurality of first flow path bulging portions is located at a downstream side in the circulation direction from the first downstream end of another of the plurality of first flow path bulging portions, the another of the plurality of first flow path bulging portions being adjacent to the one of the first flow path bulging portions.

* * * * *